United States Patent
Firey

(10) Patent No.: US 7,418,927 B2
(45) Date of Patent: Sep. 2, 2008

(54) COMMON RAIL SUPPLEMENTARY ATOMIZER FOR PISTON ENGINES

(76) Inventor: Joseph Carl Firey, P.O. Box 15514, Seattle, WA (US) 98115-0514

( * ) Notice: Subject to any disclaimer, the term of this patent is extended or adjusted under 35 U.S.C. 154(b) by 0 days.

(21) Appl. No.: 11/805,889

(22) Filed: May 25, 2007

(65) Prior Publication Data

US 2008/0098987 A1     May 1, 2008

Related U.S. Application Data

(60) Provisional application No. 60/855,111, filed on Oct. 30, 2006.

(51) Int. Cl.
    *F02D 19/04*     (2006.01)
(52) U.S. Cl. ..................................... 123/23
(58) Field of Classification Search .............. 123/1 A, 123/3.23, 25 E
See application file for complete search history.

(56) References Cited

U.S. PATENT DOCUMENTS

| | | | | |
|---|---|---|---|---|
| 4,698,069 A * | 10/1987 | Firey | ............................. | 48/61 |
| 4,782,794 A * | 11/1988 | Hsu et al. | .................... | 123/23 |
| 4,907,565 A * | 3/1990 | Bailey et al. | ................. | 123/23 |
| 5,931,123 A * | 8/1999 | Firey | ........................ | 123/25 C |
| 7,281,500 B1 * | 10/2007 | Firey | .......................... | 123/23 |

* cited by examiner

*Primary Examiner*—Thomas N Moulis

(57) ABSTRACT

A common rail supplementary atomizer of this invention, when used on a piston internal combustion engine, equipped with a common rail fuel injection system, improves slurry atomization, following injection, by expansion of gases, previously dissolved in the water phase of the slurry. This gas expansion separates the several fuel particles in each slurry droplet formed first during fuel injection. The thusly separated fuel particles subsequently burn more rapidly and completely, due to this fuel particle separation improving air access to the fuel. Apparatus is described for dissolving atomizing gas into the water phase of the slurry, in a contactor chamber at a pressure greater than the pressure prevailing in the engine cylinder volume, at the time of slurry injection.

16 Claims, 10 Drawing Sheets

COMMON RAIL SUPPLEMENTARY ATOMIZER FOR PISTON ENGINES

CROSS REFERENCES TO RELATED APPLICATIONS

The invention described herein was earlier described in my directly related Provisional U.S. patent application entitled, Common Rail Supplementary Atomizer for Piston Engines, Ser. No. 60/855,111, filed 30 Oct. 2006, Confirmation No. 3540. The invention described herein is also related to my following U.S. patent applications:
  (1) Supplementary Slurry Fuel Atomizer, Provisional U.S. patent application Ser. No. 60/838,950, filed 21 Aug. 2006.
  (2) Supplementary Slurry Fuel Atomizer and Supply System, U.S. patent application Ser. No. 11/633,107, filed 4 Dec. 2006.
  (3) Rotary Residual Fuel Slurrifier, Provisional U.S. Patent Application Ser. No. 60/881,860, filed 23 Jan. 2007.

This material is incorporated herein by reference thereto.

SUMMARY OF THE INVENTION

A common rail supplementary atomizer, of this invention, comprises a contactor chamber, in which fuel in water slurry is contacted with atomizing gas, at a pressure well above the pressure prevailing in the cylinder gas volume of an internal combustion engine. All, or portions, of the atomizing gas dissolve into the water phase of the slurry fuel. The gas remains in solution, while the slurry remains under high pressure, through the connected common rail fuel injection system of the internal combustion engine. Slurry injection into the engine cylinder gas volume breaks up the slurry fuel into many small droplets. But each droplet contains many separate small fuel particles, and these tend to agglomerate into larger fuel particles when the water portions evaporate, prior to combustion. However, when the water phase of the slurry contains atomizing gas, dissolved at the high pressure in the contactor chamber, the injected fuel droplets will be broken apart when these dissolved gases expand out of solution, at the lower pressures in the cylinder gas volume, and the small separate fuel particles will thus be separated from each other, instead of agglomerating into fewer larger fuel particles. As a result a greater area of fuel particle surface is available for air access, and these small fuel particles are dispersed into a larger air volume. In this way the combustion of a slurry fuel will be more rapid and complete, when using a common rail supplementary atomizer of this invention, and this is one of the principal beneficial objects of this invention.

Earlier engine experiments, with coal particle in water slurry fuels, indicates that, as coal particle size was reduced, in an effort to increase the rate of combustion, these smaller particles increased the effective viscosity of the slurry, and larger slurry droplets resulted during fuel injection into the engine. Subsequent coal particle agglomeration within each droplet, created larger fuel particles with slower, and less complete, combustion. As a result, better engine performance was obtained at intermediate coal particle size, and the anticipated better results, for very small coal particles, were not realized. It is a principal beneficial object of this invention to make available the improvements of engine combustion, potentially available from the use of smaller coal particles, or smaller residual petroleum fuel particles, in fuel in water slurry fuels. Many internal combustion engine applications, currently obliged to operate on expensive distillate petroleum fuels, could operate instead on low cost residual petroleum fuels by use of the apparatus of this invention. In this way a larger portion of the crude petroleum oil could be used for our critical transportation needs.

BACKGROUND OF THE INVENTION

The use of high viscosity low cost fuels, such as residual petroleum fuels, in internal combustion engines is presently limited to very large bore, slow speed, marine diesel engines. In these large bore engines, the high fuel injection pressures, needed for adequate atomization of residual petroleum fuels, can be utilized without excessive fuel penetration and cylinder wall impact, since the large cylinder diameter provides an adequately long fuel spray penetration path. But in medium speed, medium bore, diesel engines, and particularly in high speed, small bore, diesel engines, these high viscosity residual petroleum fuels are poorly burned. Either poor atomization results, at injection pressures low enough to avoid fuel impact on the cylinder wall, or fuel impact on the cylinder wall occurs, at the high injection pressures needed for adequate atomization of these high viscosity fuels.

Preatomizing the fuel, outside of the engine cylinder volume, and suspending the very small fuel particles in a continuous water phase, to create a fuel-in-water slurry offers a potential method for utilizing high viscosity residual petroleum fuels, in both medium bore, medium speed, diesel engines, and small bore, high speed, diesel engines, which are widely used in our transportation systems. Example methods and apparatus for preparing residual fuel in water slurries suitable for use with the apparatus of this invention are described in the following references:
  (1) U.S. Pat. No. 6,444,000, 2002, Firey
  (2) U.S. Provisional Patent Application Ser. No. 60/881,860, 23 Jan. 2007, Firey, as listed in the Cross References to Related Applications.

Use of such preatomized, fuel in water slurries would appear to relieve the engine fuel injection system of the obligation to carry out the full extent of atomization needed for rapid and complete fuel burning, and hence the lower fuel injection pressures, with the reduced penetration, needed in small or medium bore engines can be used, and yet adequate atomization, with rapid and complete fuel combustion, will result.

Engine experiments, with preatomized coal particle in water slurry fuels, in medium speed, medium bore, railroad diesel engines, revealed a potential limitation in the combustion benefits to be obtained by use of increasingly smaller fuel particle size, in fuel in water slurry fuels. As fuel particle size was reduced, the effective viscosity of the slurry increased, and larger slurry droplet size resulted when the slurry was injected into the engine cylinder volume. Thus a greater number and weight of fuel particles resided within each injected slurry droplet, as fuel particle size was reduced.

Indications are that within each slurry droplet, the several separate small fuel particles tended to reagglomerate into one, or a few, larger fuel particles, when the water phase evaporated prior to ignition and combustion. The result was that, the benefits sought by preatomizing the fuel into smaller particles, were not realized, and best engine results were obtained at intermediate fuel particle size.

The capability of operating a major portion of our transportation system on low cost residual petroleum fuels, instead of the present high cost distillate petroleum fuels, would be a substantial benefit. Diesel engine operators would realize a reduced fuel cost. The national effort toward energy independence would be promoted, since the stationary energy applications, currently using residual fuels, could more readily and economically shift to coal use than is possible for the critical transportation sector.

BRIEF DESCRIPTION OF THE DRAWINGS

One example form of this invention is shown schematically in FIG. 1, and comprises, an internal combustion engine, 1, equipped with a common rail supplementary atomizer, comprising a common rail fuel injection system, 10, combined with a contactor chamber, 9, wherein a portion of a slurry fuel is contacted with soluble atomizing gas.

Another example form of this invention is shown schematically in FIG. 2, wherein undissolved portions of the atomizing gas are discharged from the top of the contactor chamber, 9, via an exit gas flow restrictor, 33.

Figure 3:
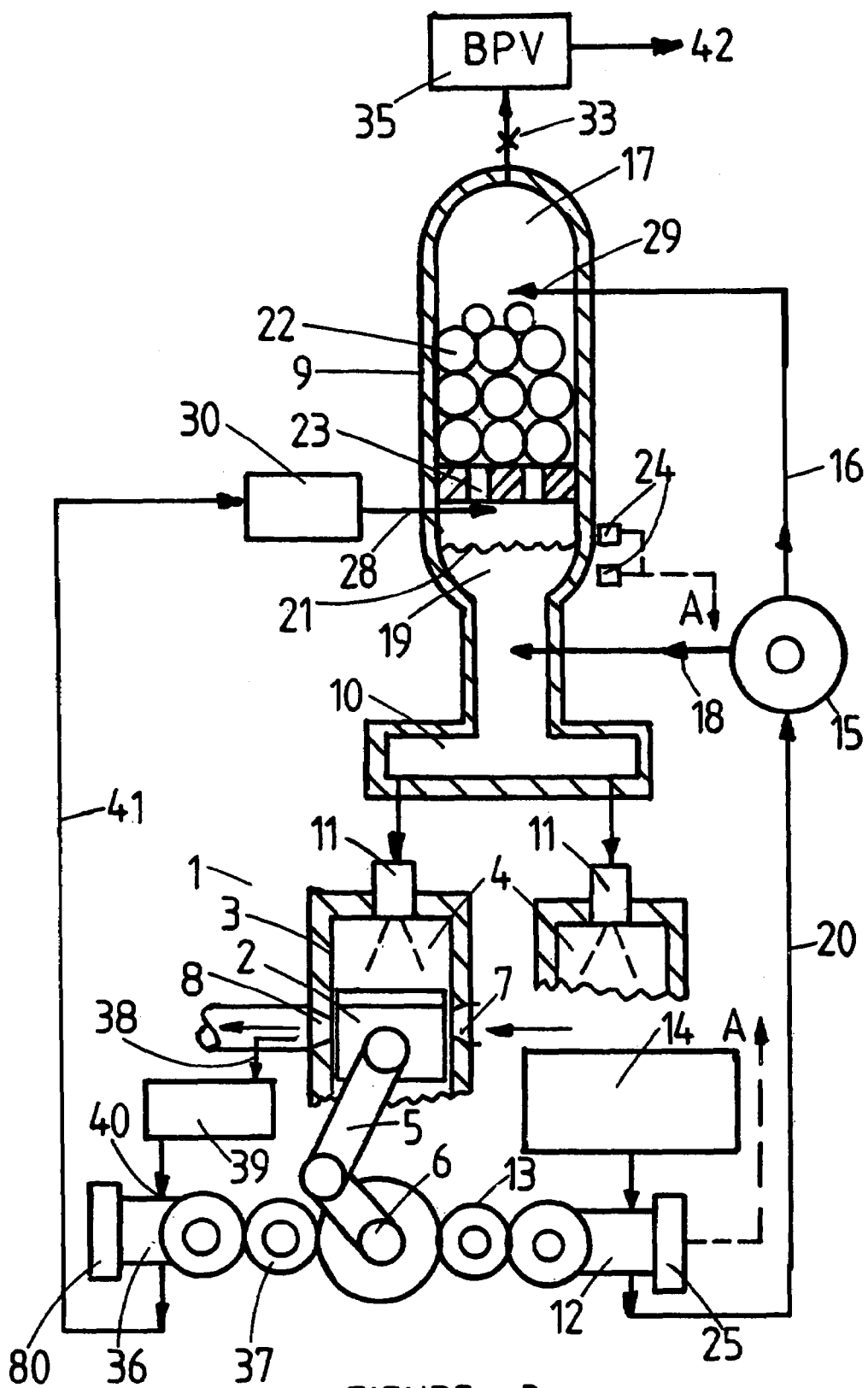

The example form of this invention, shown schematically in FIG. 3, utilizes engine exhaust gas as the atomizing gas.

Figure 4:
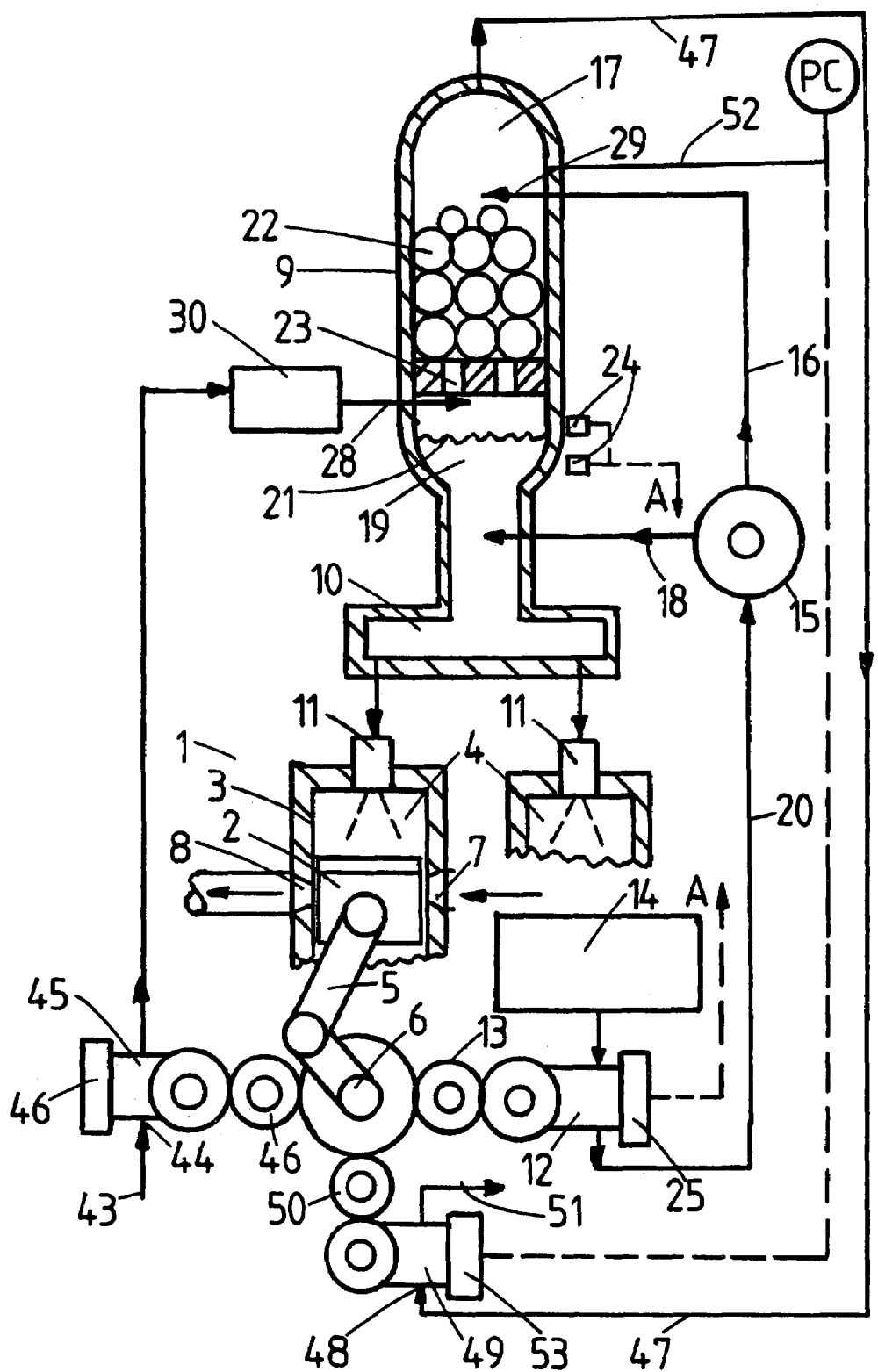

The example form of this invention, shown schematically in FIG. 4, uses air as atomizing gas, and recovers some of the work of gas compression by use of a work recovery engine, 49.

Figure 5:
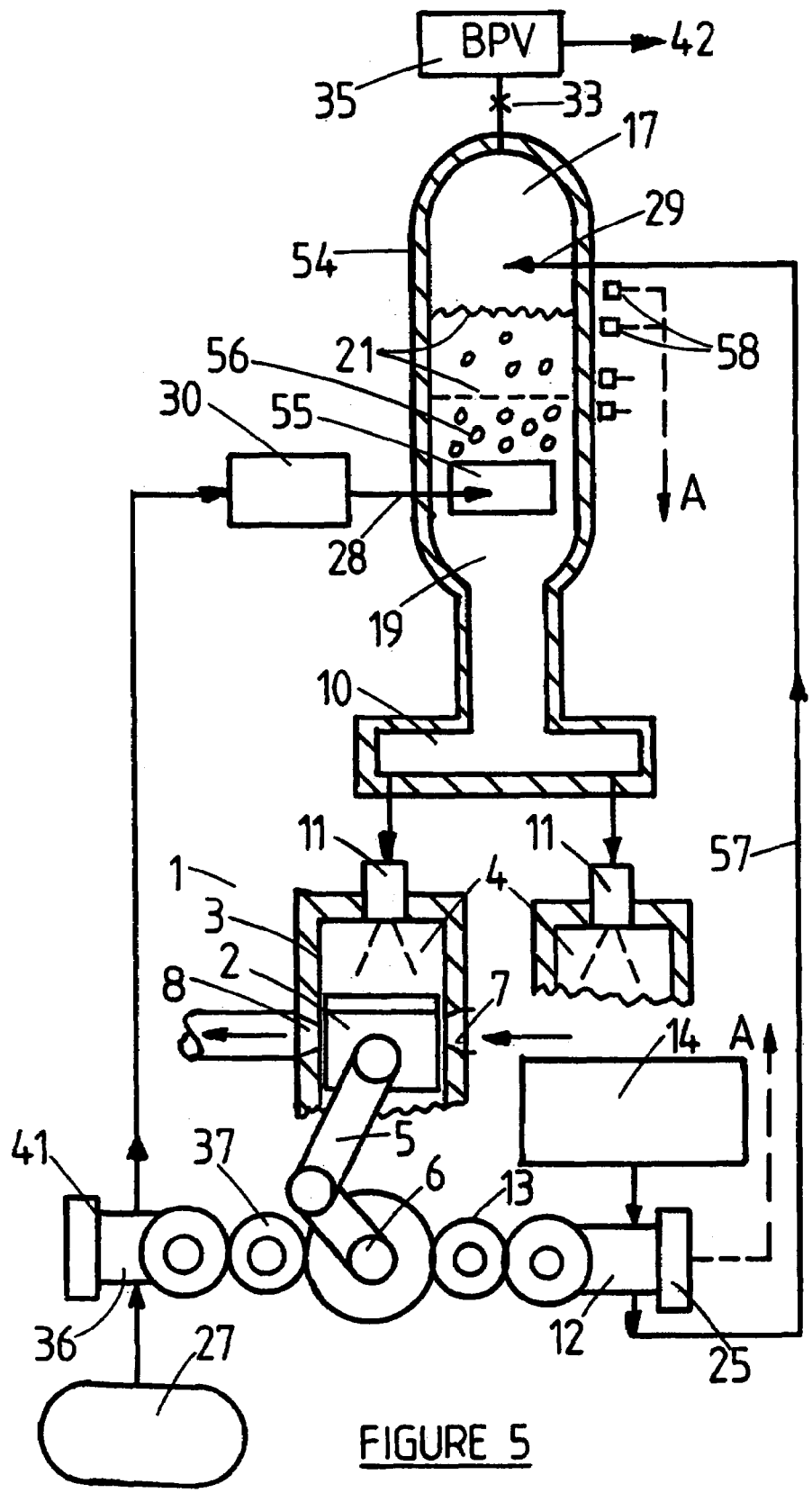

In the FIG. 5 form of this invention the undivided entire flow of slurry fuel is contacted with soluble atomizing gas in the contactor chamber, 54.

Figure 6:
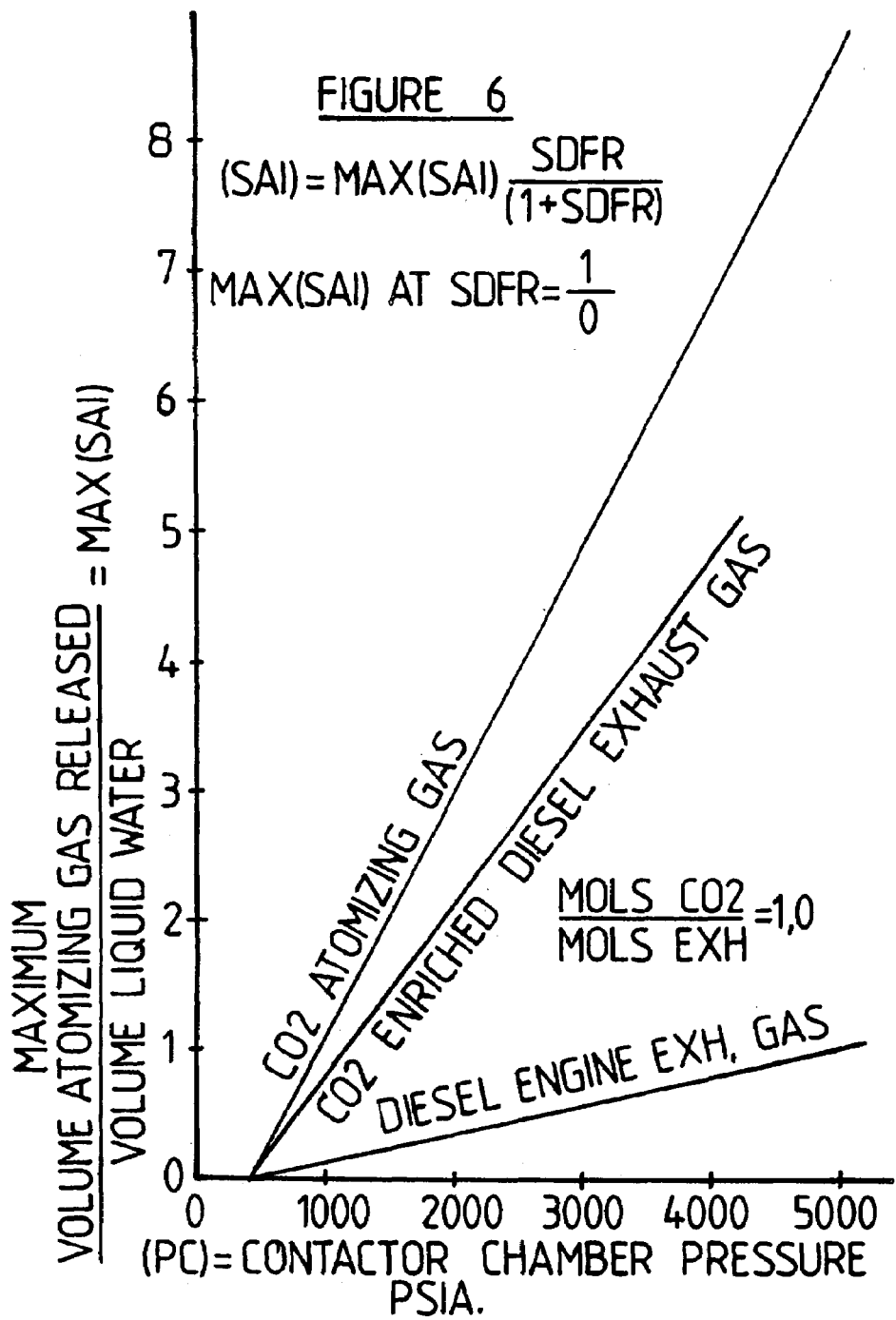

The supplementary atomizing capacity of several illustrative atomizing gases is shown graphically in FIG. 6 as a function of contactor chamber pressure.

Figure 7:
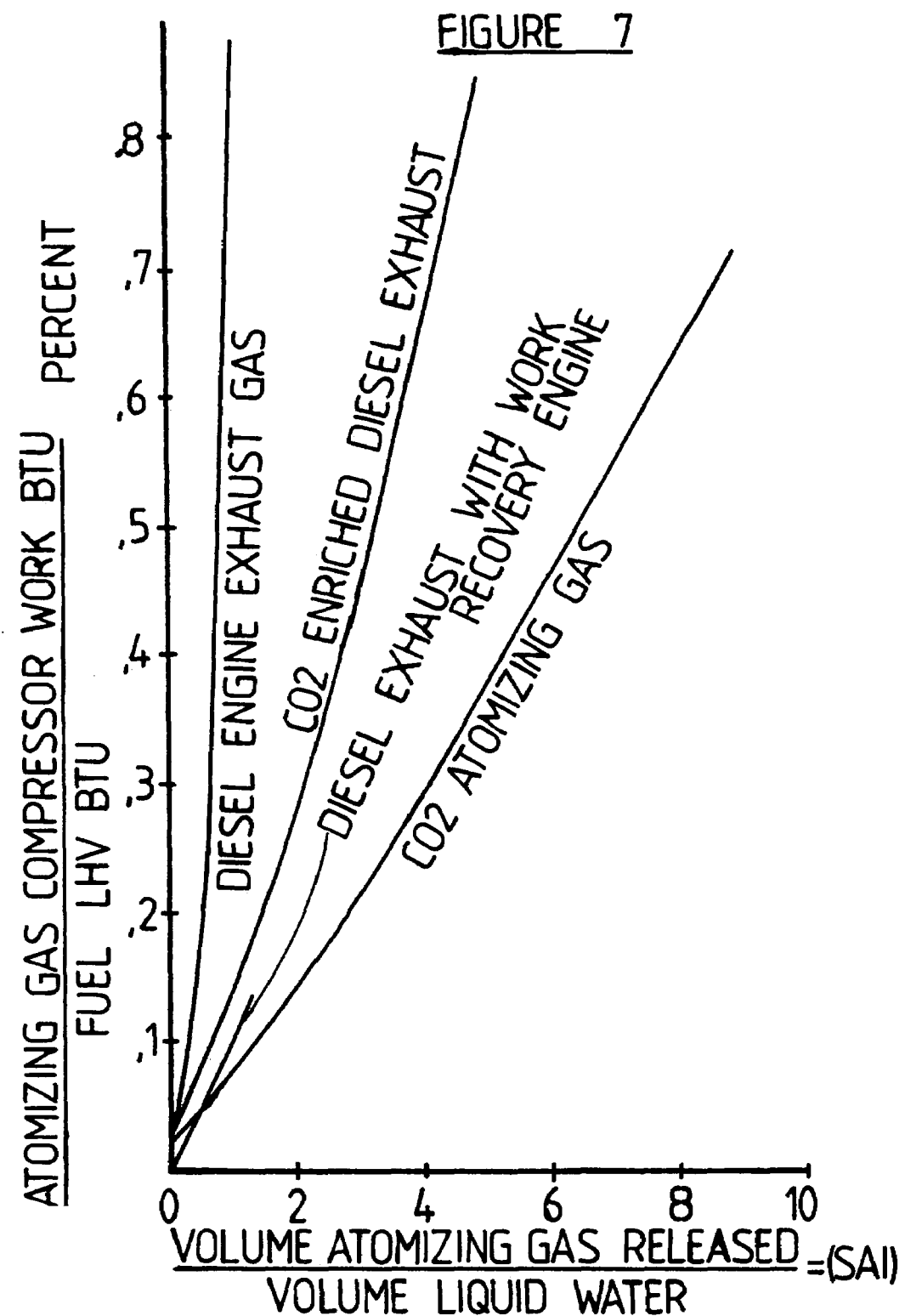

The engine work output lost to the compressing of the atomizing gas is shown graphically in FIG. 7, for several atomizing gases, as a function of supplementary atomizing capacity.

Figure 8:
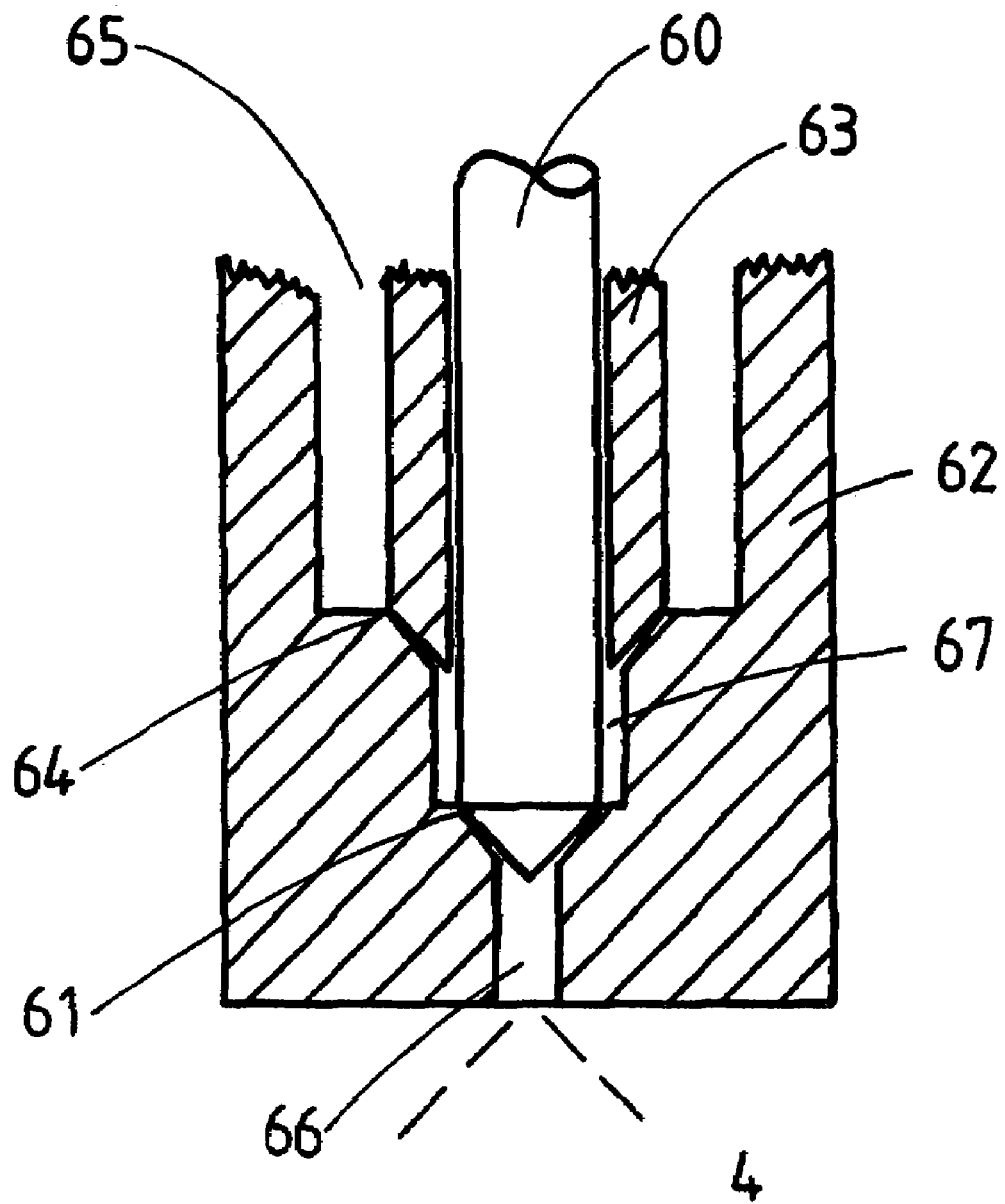

An example form of fuel injector nozzle, with double valves in the fuel flow passage, is shown schematically in FIG. 8.

Figure 9:
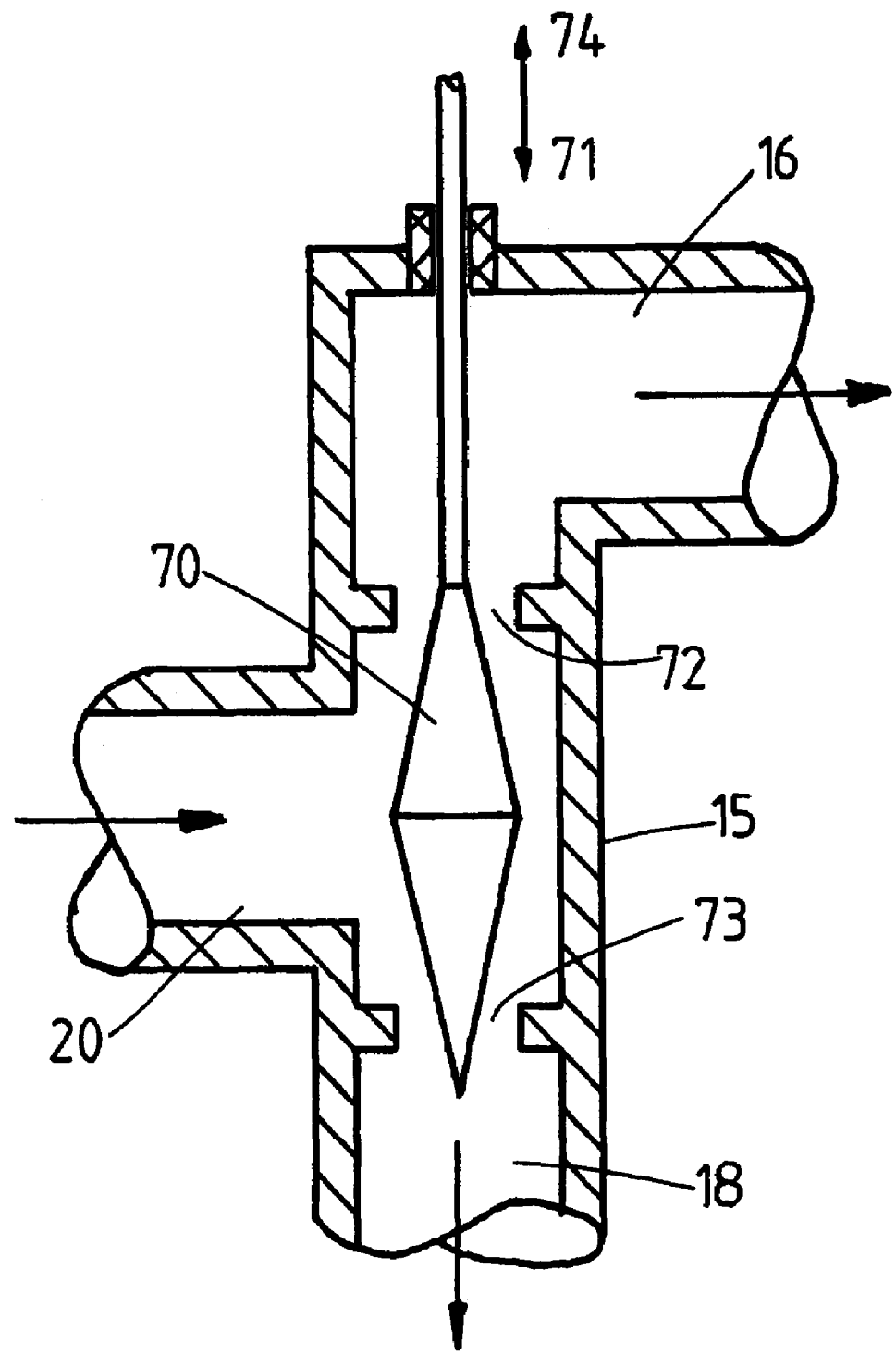
Figure 10:
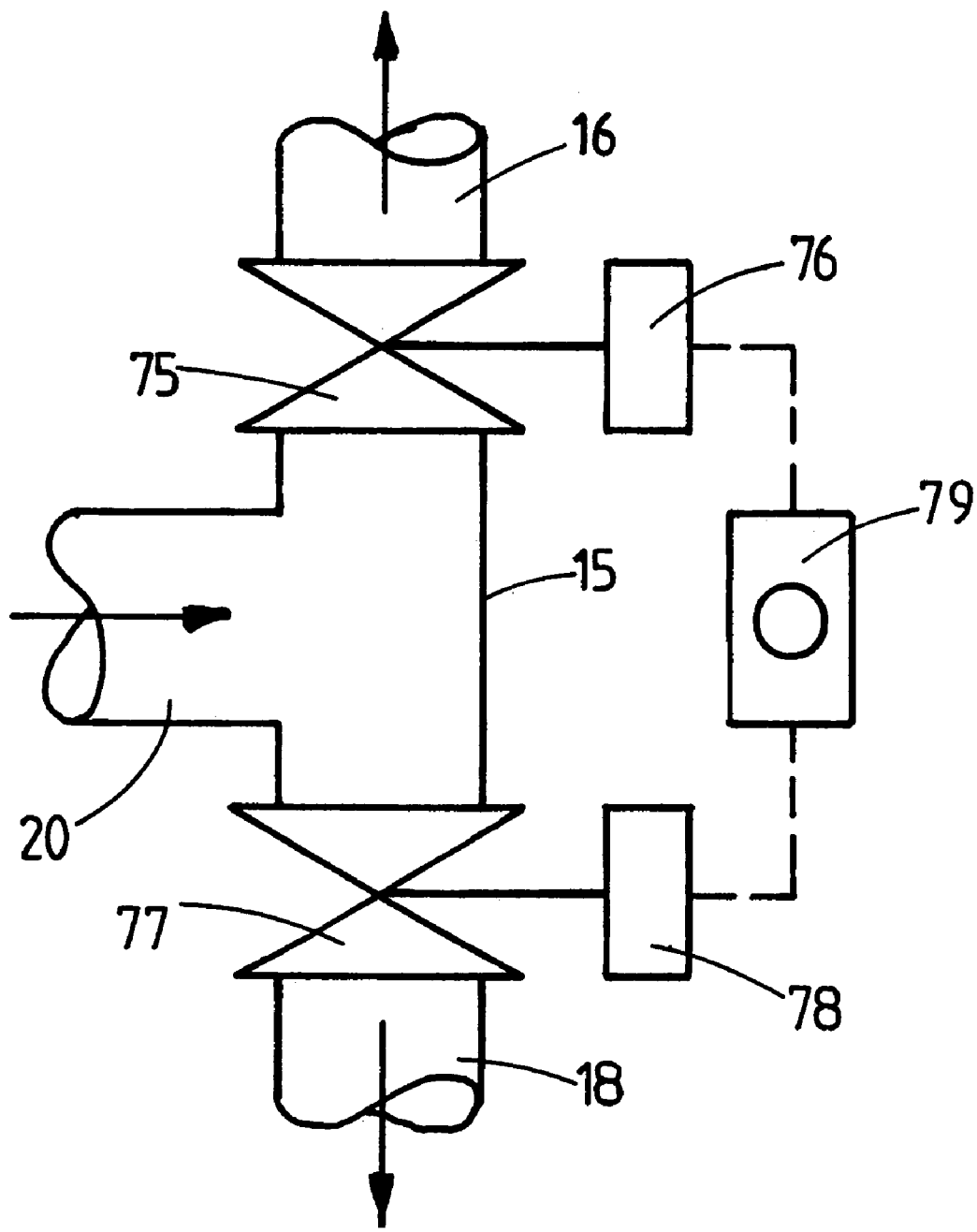

Examples of slurry fuel flow dividers are illustrated schematically in FIG. 9 and FIG. 10.

None of the schematic apparatus drawings are to scale.

DESCRIPTION OF THE PREFERRED EMBODIMENTS

The apparatus of this invention operates to dissolve atomizing gas, at high pressure, into the liquid water portion of a fuel in water slurry, where liquid water is the continuous phase. When this gas saturated slurry is subsequently injected, into the lower pressures prevailing in the engine cylinder gas volume, these dissolved gases expand out of the water phase within each injected slurry droplet. This gas expansion between fuel particles separates the particles and prevents particle agglomeration during subsequent water evaporation, prior to fuel ignition and combustion. In this way the full benefits of fuel preatomization into very small fuel particles, suspended in a continuous water phase, can be achieved by use of the apparatus of this invention.

Various combinations of materials can be used for the suspended particle portion, and the continuous phase portion, of slurries suitable for use with the apparatus of this invention. The supplementary atomizing gas is matched to each particular slurry combination. In general each usable slurry is a gas dissolving fluid, at least some portions of which are a combustible non-gaseous fuel, and at least some portions of which are capable of dissolving some gases. At least some portions, of the atomizing gas used, are to be soluble in at least portions of the gas dissolving fluid. Examples of slurry combinations, and suitable atomizing gases, are described hereinbelow.

A. The FIG. 1 Form of the Invention

The apparatus of this invention comprises a combination of a piston internal combustion engine with a common rail supplementary atomizer. One particular example form of this combination is illustrated schematically in FIG. 1.

1. The piston internal combustion engine portion of this combination comprises the following elements:

(a) A piston internal combustion engine, 1, comprises a piston, 2, operative within a cylinder, 3, and these enclosing a cylinder gas volume, 4. The piston connects, via a connecting rod, 5, to the engine crankshaft, 6. Air for combustion enters the cylinder gas volume via an intake port, 7, and burned exhaust gas leaves the cylinder gas volume via an exhaust port and pipe, 8.

(b) The common rail distribution system comprises a contactor chamber, 9, free flow connected at bottom to a common rail chamber, 10, from which fuel is injected via fuel injectors, 11, into each cylinder gas volume, 4, during a time period for fuel injection.

(c) The slurry fuel pump and driver, 12, is driven directly from the engine crankshaft, 6, as by gears or belts, 13. The slurry fuel pump pumps slurry fuel, from the slurry fuel source, 14, into a slurry fuel flow divider, 15, via connection, 20.

(d) The slurry fuel flow divider, 15, divides the flow of slurry fuel, from the slurry fuel pump, 12, into two separate flows; one separate flow is directed via connection, 16, into the upper portion, 17, of the contactor chamber, 9; the other separate flow is directed via connection, 18, into the lower portion, 19, of the contactor chamber, 9, and below the level of slurry fuel, 21, maintained in the lower portion of the contactor chamber, 9.

(e) The contactor chamber, 9, includes an upper portion, 17, occupied in part by gas, and a lower portion, 19, occupied by slurry fuel, and these upper and lower portions are free flow connected together. The contactor chamber and connected common rail chamber are to be operated at essentially the same contactor chamber pressure, PC, appreciably greater than the pressure prevailing in the cylinder gas volume, 4, during the time when slurry fuel is injected into each cylinder gas volume, and equal to the slurry fuel injection pressure needed for adequate primary atomization of the slurry fuel.

(f) The upper portion of the contactor chamber, 9, is partially filled with chunks of packing material, 22, such as glazed ceramic or other type materials, resting on a support element, 23, fitted with gas and slurry fuel throughflow holes. These chunks of packing material, 22, are of a shape, such as round, so that gas and liquids can readily flow through the contactor chamber.

(g) Slurry fuel level sensors, 24, for sensing the slurry level, 21, in the contactor chamber, 9, are input to a slurry fuel pump and driver control, 25, which operates to keep the lower portion, 19, of the contactor chamber full of slurry fuel, and to keep the slurry fuel level, 21, out of the upper portion, 17, of the contactor chamber, 9.

(h) Atomizing gas, at least some portions of which are at least moderately, and preferably highly, soluble in liquid water, is transferred by an adjustable flow rate atomizing gas transfer pump, 26, from the atomizing gas source, 27, into the upper portion, 17, of the contactor chamber, 9, via connection, 28, below the packing support element, 23, and above the slurry fuel level, 21, and thus at a level well below the level, 29, in the contactor chamber where that one separate flow of slurry fuel is directed into the tipper portion, 17, of the contactor chamber, 9. A gas cooler, 30, can be interposed between the atomizing gas transfer pump, 26, and the contactor chamber, 9, in order to cool the atomizing gas and thus increase its solubility in the continuous water phase of the slurry fuel. The atomizing gas pump, 26, can be driven by various drivers, such as by gears or belts, 34, from the engine crankshaft, 6.

(i) That one separate flow of slurry fuel directed into the upper portion, 17, of the contactor chamber, flows downward through the contactor chamber, 9, and is spread out over a large area as it flows over the surfaces of the packing material, 22. The atomizing gas, in contact with the slurry fuel, is thus dissolved into the continuous liquid water phase of the slurry fuel, and undissolved portions rise upward across the packing material surfaces. In this way the water phase of that one separate flow of slurry fuel, flowing downward through the upper portion of the contactor chamber, becomes partially, or at most fully, saturated with atomizing gas.

(j) That other separate flow of slurry fuel entered the contactor chamber below the slurry fuel level, 21, and thus is not in direct contact with atomizing gas. As a result, the liquid water portion of this other separate flow of slurry fuel has no dissolved atomizing gas therein.

(k) These two separated flows of slurry fuel, the water portion of one at least partially saturated with atomizing gas, the water portion of the other being free of atomizing gas, rejoin in the lower portion, 19, of the contactor chamber. Thus rejoined, these two slurry fuel portions interblend, and atomizing gas interdiffuses into both continuous water portions. As a result the water phase of the fully rejoined slurry fuel is assuredly less than saturated with atomizing gas.

(l) The rejoined full flow of slurry fuel, thus partially saturated with atomizing gas, flows into the common rail, 10, and from there is injected, via the fuel injectors, 11, into the cylinder gas volume, 4. This fuel injection process breaks up the slurry fuel, by primary atomization, into many small separate slurry fuel droplets, each such slurry fuel droplet containing many separate fuel particles. At the lower pressures prevailing in the cylinder gas volume, 4, much of the atomizing gas expands out of solution from the continuous liquid water phase and thus separates the fuel particles within each slurry fuel droplet. The thusly separated fuel particles provide a large fuel surface area for oxygen access, during the subsequent fuel ignition and combustion process, following after evaporation of the water portion of the slurry. In this way, a higher rate of fuel combustion, and more complete fuel burnup, is achieved, than would be possible if the many separate fuel particles, within each slurry fuel droplet, had not been thusly separated by atomizing gas expansion. This is a principal beneficial object of this invention, that efficient combustion of residual petroleum fuels, and tars, and coal, etc., can be achieved in small bore, high speed, internal combustion engines, by preatomizing these fuels into a fuel in water slurry.

(m) The use of a slurry fuel flow divider, 15, is one way to assure incomplete saturation of the continuous liquid water phase of that slurry fuel being injected from the common rail, 10, into the engine cylinder gas volume, 4. Were the slurry fuel water phase fully saturated with atomizing gas in the common rail, moderate pressure drop between the common rail, and the fuel injector, 11, exit could cause foaming and erratic fuel metering.

(n) The degree of unsaturation of the liquid water phase of the final rejoined slurry fuel can be adjusted by adjusting the slurry divider flow ratio of, that one separate slurry fuel flow into the upper portion of the contactor chamber, divided by that other separate slurry fuel flow into the lower portion of the contactor chamber. The degree of unsaturation of the rejoined slurry fuel in the common rail can be increased by decreasing this ratio of the two separated slurry fuel flows. For this purpose, an adjustable slurry fuel flow divider can be used. For best overall atomization, the slurry divider flow ratio can be increased, up to the point where erratic fuel metering commences due to slurry foaming.

(o) The contactor chamber pressure sensor, 31, is an input to the controller, 32, of the adjustable flow rate atomizing gas pump, 26, which functions to maintain an essentially constant average contactor chamber pressure, PC, in the contactor chamber, 9, and the common rail, 10, between an upper set value and a lower set value. When contactor chamber pressure drops below the lower set value, the controller, 32, increases the flow rate of atomizing gas into the contactor chamber. When contactor chamber pressure rises above the upper set value the controller decreases the flow rate of atomizing gas into the contactor chamber.

(p) Contactor chamber average pressure is thusly controlled to be greater than the pressure prevailing in the engine cylinder gas volume, during the time when slurry fuel is being injected. In this way atomizing gas will expand out of the water phase, within each slurry fuel droplet, only when the slurry fuel is injected into the lower pressure of the engine cylinder gas volume. Contactor chamber pressure and common rail pressure are to be equal to the slurry fuel injection pressure needed for adequate primary atomization of the slurry fuel into the slurry fuel droplets.

(q) The atomizing gas pump, 26, thus compresses atomizing gas, from source pressure, up to fuel injection pressures of a few to several thousands of pounds per square inch. A multistage atomizing gas pump, with interstage intercoolers, will be preferred, in order to reduce the engine work loss to atomizing gas compression.

Figure 1:
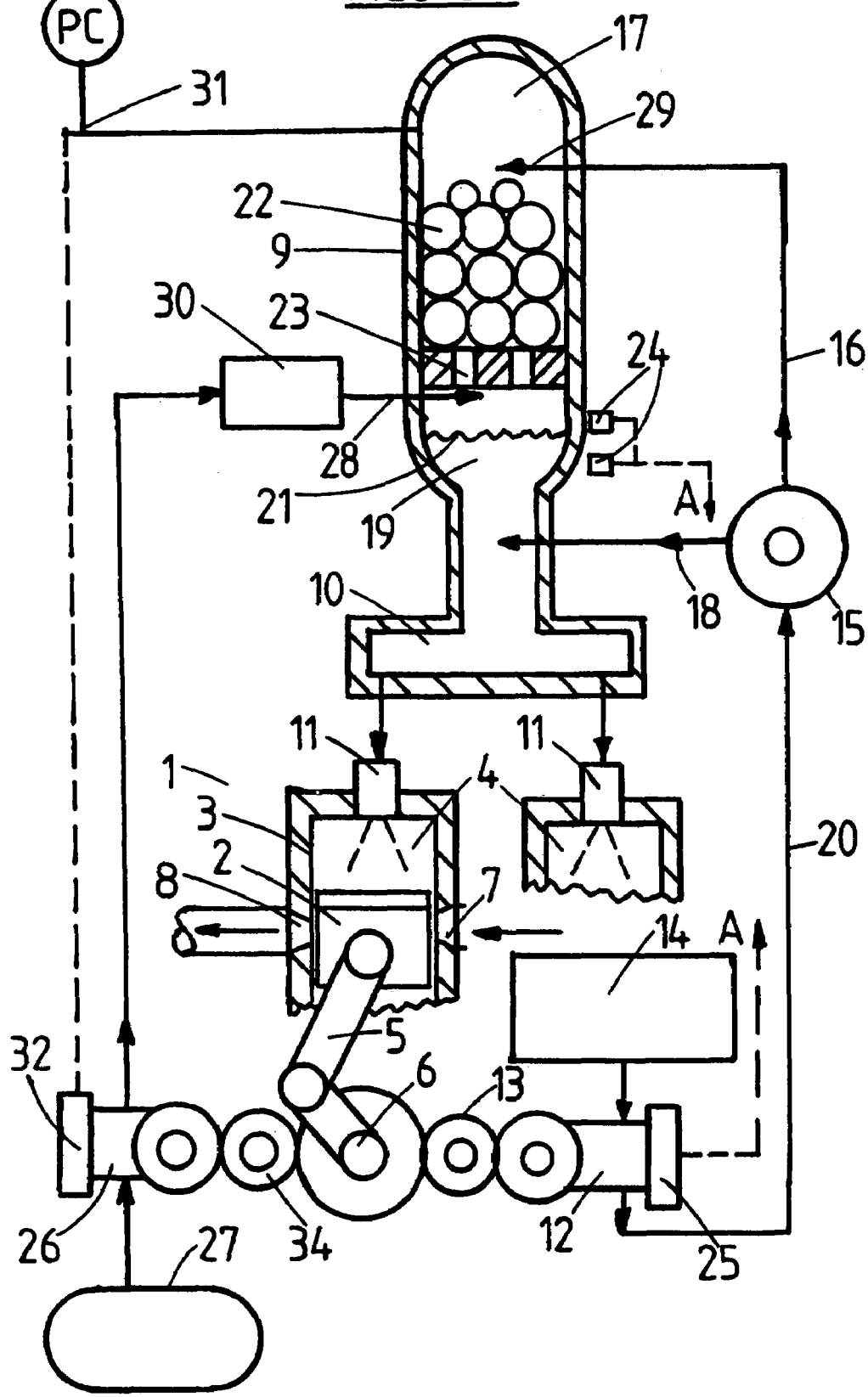

(r) For this FIG. 1 form of the invention, all of the atomizing gas needs to be highly soluble in water, since very low solubility gas portions would accumulate in the upper portion, 17, of the contactor chamber, and eventually stop the flow of atomizing gas into the contactor chamber. Pure carbon dioxide gas, would be a suitable atomizing gas source, 27, for this FIG. 1 form of the invention, and carbon dioxide gas is highly soluble in water. But it is a disadvantage of this FIG. 1 form of the invention that a pure gas source is needed and is expensive.

B. The FIG. 2 Form of this Invention

Figure 2:
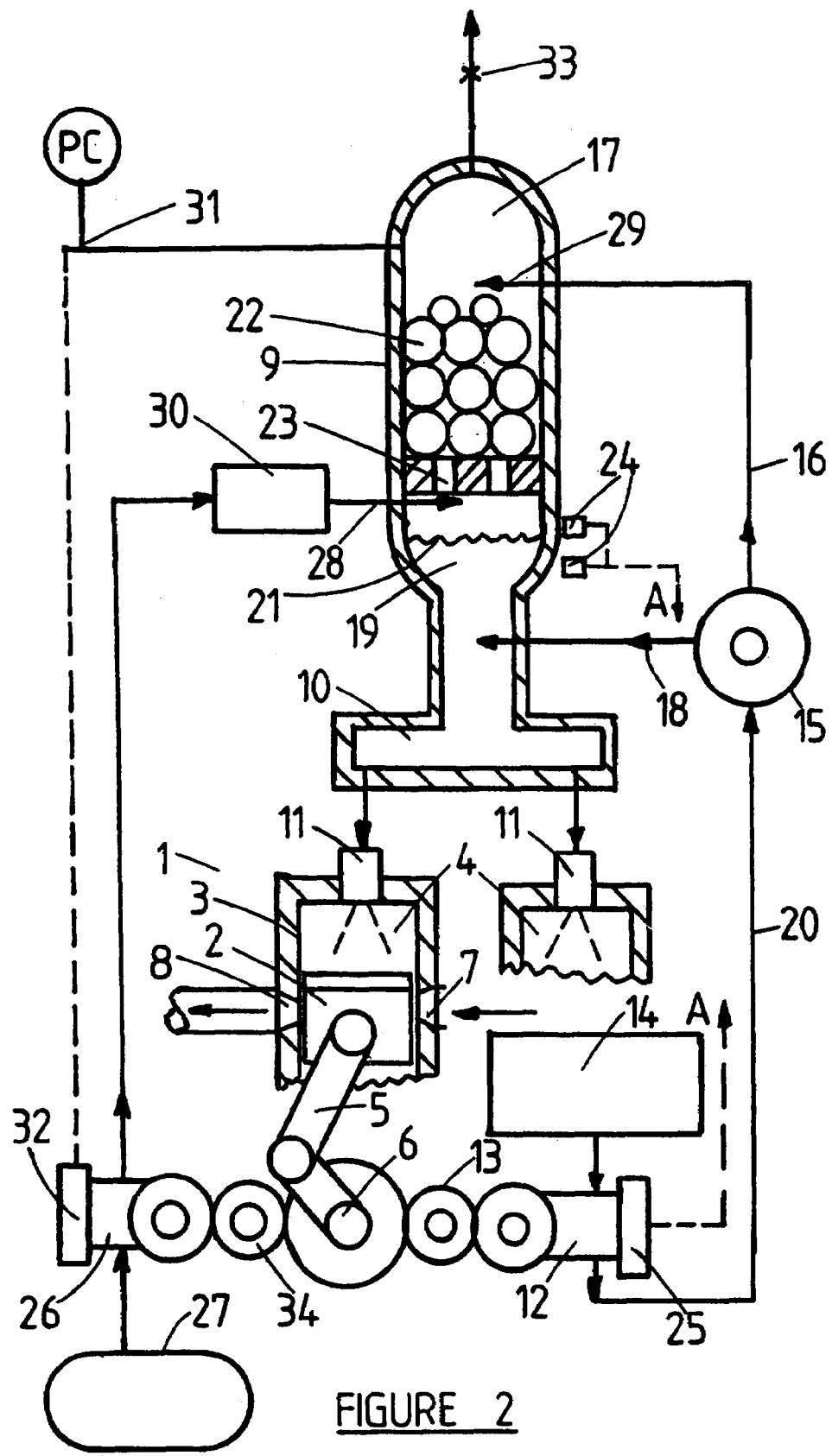

The form of this invention, shown schematically in FIG. 2, is essentially similar to the above described FIG. 1 form of this invention, and differs therefrom by providing an exit flow of undissolved portions of the atomizing gas, from the top of the upper portion, 17, of the contactor chamber, via a gas exit flow restrictor passage, 33, into the atmosphere as a receiver of discharged atomizing gas. By thus discharging the low solubility, undissolved, portions of the atomizing gas, this FIG. 2 form of this invention can utilize commercial purity atomizing gases, such as carbon dioxide commercial grade, and these gases are less expensive than pure carbon dioxide gas.

The other elements of this FIG. 2 form of the invention can be similar, in construction and operation, to those described hereinabove for the FIG. 1 form of the invention and these elements are similarly numbered in FIG. 2.

Some of the carbon dioxide gas, or other highly soluble gas, available from the supply source tank, 27, will be lost with the gas discharged via the gas exit flow restrictor, 33. This loss can be reduced: by using a longer contact path of slurry fuel with atomizing gas in the contactor chamber; by using smaller chunks of packing material, 22, to present a larger contact surface area; and by using a smaller exit flow restrictor area.

C. The FIG. 3 Form of this Invention
1. In principal, many different gases, and gas mixtures, could be used as the atomizing gas in this invention, since many gases are water soluble, and the amount of gas dissolved into the water increases approximately linearly with increasing gas pressure. Carbon dioxide gas is particularly attractive for use as atomizing gas, since it is highly soluble in water. But carbon dioxide gas usage is an expense. Internal combustion engine exhaust gas contains carbon dioxide from the fuel combustion, together with some oxygen, of moderate water solubility, and a principal portion of nitrogen, of rather low water solubility; and its use as atomizing gas involves no expense. The low solubility nitrogen portion is unlikely to be fully dissolved into the water phase of the slurry fuel. As a result, use of diesel engine exhaust gas, as atomizing gas, will require an appreciable discharge of undissolved gas portions from the top of the upper portion, 17, of the contactor chamber, 9. An example modified form of this invention is illustrated schematically in FIG. 3, suitable for the use of engine exhaust gas as the atomizing gas, and comprises:
   a) This FIG. 3 form of this invention is essentially similar to the above described FIG. 2 form of this invention, and differs therefrom principally by providing a back pressure sensor and controller, 35, of the flow area of the exit flow restrictor passage, 33, to control contactor chamber pressure, and by using a fixed displacement atomizing gas pump, 36, driven at a fixed multiple of engine crankshaft revolutions per unit of time, as by gears or belts, 37. This atomizing gas pump, 36, is thus not an adjustable flow rate atomizing gas pump, as was used for the FIG. 2 form of this invention.
   b) Internal combustion engine exhaust gas is transferred, from the engine exhaust system, 8, via the gas flow connection, 38, into an engine exhaust gas precooler, 39, and from the precooler into the suction inlet, 40, of the atomizing gas pump, 36. The atomizing gas pump, 36, compresses the engine exhaust gas up to contactor chamber pressure, and transfers the compressed atomizing gas via connection, 80, into the contactor chamber, 9, below the support element, 23, and below the chunks of packing material, 22, and thus at a level well below the level in the contactor chamber, where the one separate slurry fuel flow is being transferred into the upper portion of the contactor chamber above the chunks of packing material. It is preferable to cool the atomizing gas passing through the atomizing gas pump, 36, as by use of pump cooling jackets, and interstage intercoolers, 80. It is also preferable to cool the atomizing gas after compression and before entering the contactor chamber, as by use of post coolers, 30. These several atomizing gas coolers act to reduce the work required to compress the atomizing gas, and increase the solubility of the atomizing gas in the water phase of the fuel in water slurry, since gas solubility increases as temperature is reduced.
   c) Some portions of the engine exhaust as atomizing gas, such as the low solubility but major nitrogen portion, will not be fully dissolved into the water phase of the slurry fuel. These undissolved atomizing gas portions are discharged from the top of the contactor chamber, via a gas exit flow restrictor, 33, whose exit flow area, for this FIG. 3 form of the invention, is adjustable by a back pressure control, 35. The discharged atomizing gas is transferred into a receiver of discharged atomizing gas, 42, which for this FIG. 3 form of the invention, is the atmosphere. The back pressure control, 35, senses contactor chamber pressure, and operates to increase the area of the gas flow restrictor, when contactor chamber pressure exceeds an upper set value, and to decrease the gas flow restrictor area, when contactor chamber pressure is less than a lower set value. In this way the back pressure control, 35, functions to maintain an average contactor chamber pressure between the upper and lower set values. As for the FIG. 2 form of this invention, this average contactor chamber pressure, for the FIG. 3 form of this invention, is to be appreciably greater than the pressure prevailing in the engine cylinder gas volume, 4, while slurry fuel is being injected thereinto, as described hereinabove.
   d) When a multicomponent atomizing gas, such as internal combustion engine exhaust gas, is used as atomizing gas, the quantity of each gas component, dissolvable into the water phase of the slurry fuel, varies approximately linearly with the partial pressure of the gas component in the atomizing gas, and the solubility of that component in water. Thus a larger portion of the high solubility carbon dioxide gas, in the engine exhaust gas, can be dissolved into the water phase than of the nitrogen gas, even though the carbon dioxide partial pressure is much less than the partial pressure of the low solubility nitrogen. Approximate calculations for a diesel engine exhaust gas, at rated power output, indicate that the gas, dissolvable into the water phase of the slurry fuel, will be about 80% by mols carbon dioxide gas, and only about 15% by mols nitrogen. It is thus possible to improve the supplementary slurry fuel atomizing capabilities, of this FIG. 3 form of the invention, by blending additional carbon dioxide gas into the internal combustion engine exhaust gas, to increase the partial pressure of carbon dioxide gas in the atomizing gas transferred into the contactor chamber.
   e) Atmospheric air can also be used, instead of internal combustion engine exhaust gas, as a multicomponent atomizing gas, in the FIG. 3 form of this invention, the oxygen portion possessing moderate solubility in water. Also the supplementary slurry fuel atomizing capabilities of air can be improved by blending carbon dioxide gas with the air.

f) A risk of explosions, within the contactor chamber, exists when atomizing gases containing molecular oxygen, such as atmospheric air, or diesel engine exhaust gas at light loads, are used in combination with fuels containing some volatile portions, such as bituminous coals, and perhaps some residual petroleum fuels. Such explosions could be initiated by an unlikely, but possible, electric spark, or by a pressure wave. This explosion risk can be reduced by blending carbon dioxide gas into those atomizing gases containing molecular oxygen.

D. The FIG. 4 Form of this Invention

1. To achieve the purposes of this invention, contactor chamber pressure needs to appreciably exceed the pressure in the cylinder gas volume during slurry injection. Cylinder gas volume pressures, during slurry injection, can be as high as 500 to 1000 psia, depending on internal combustion engine compression ratio, and slurry fuel injection timing. Hence contactor chamber pressures can be of the order of a few, or several, thousands of pounds per square inch. As a result the work of compressing the atomizing gas will create a loss of internal combustion engine work output and efficiency. Part of this work, lost to the compression of atomizing gas, can be recovered, by passing undissolved atomizing gas, being discharged from the top of the contactor chamber, through a work recovery engine. A particular example form of this invention, using such a work recovery engine is illustrated schematically in FIG. 4, and comprises:

a) This FIG. 4 form of this invention is essentially similar to the above described FIG. 3 form of this invention, and differs therefrom principally by; utilizing a work recovery engine, 49, instead of a back pressure valve, to control contactor chamber pressure, and by using atmospheric air, 43, instead of engine exhaust gas, as the atomizing gas.

b) Atmospheric air, 43, is the source of atomizing gas into the suction inlet, 44, of a rotary atomizing gas pump, 45, which is driven directly, as by gears or belts, 46, from the internal combustion engine crankshaft, 6. The atomizing gas pump, 45, compresses the air up to contactor chamber pressure, and transfers this compressed air, as atomizing gas, into the contactor chamber, 9, below the support element, 23, and below the chunks of packing material, 22. Preferably the air is cooled during compression, as by interstage intercoolers, 46, and also following compression, as by post coolers, 30, before being delivered into the contactor chamber, 9.

c) Within the contactor chamber, 9, the air, as atomizing gas, is partially dissolved into the water phase of the downward flowing slurry fuel, while flowing upward through the packing material. Undissolved air portions are discharged from the top of the upper portion, 17, of the contactor chamber, and pass, via the atomizing gas discharge flow connection, 47, into the gas flow inlet, 48, of the rotary work recovery engine, 49. This work recovery engine, 49, is gear or belt connected, 50, to the crankshaft, 6, of the internal combustion engine, so that the work recovered by this engine, 49, offsets in part the internal combustion engine work lost to driving the atomizing gas compressor, 45.

d) The undissolved atomizing gas portions expand through the work recovery engine, 49, and is discharged into the atmosphere, 51, as a receiver of discharged and expanded atomizing gas.

e) The combination of the atomizing gas compressor, 45, transferring atomizing gas into the contactor chamber, 9, with a work expander engine, 49, receiving and discharging undissolved atomizing gas out of the contactor chamber, can function as a contactor chamber pressure controller, for maintaining an essentially constant average pressure in the contactor chamber, 9. This controller would be responsive to a contactor chamber pressure sensor, 52, and would be operative to adjust the difference quantity, between the flow rate of atomizing gas into the contactor chamber, minus the flow rate of undissolved atomizing gas out of the contactor chamber. When contactor chamber pressure was below a lower set value, slightly below average contactor chamber pressure, this controller would increase this difference quantity. When contactor chamber pressure was above an upper set value, slightly above average contactor chamber pressure, this controller would decrease this difference quantity. In this way average contactor chamber pressure would be maintained essentially constant, and, as needed for all forms of this invention, greater than the pressure prevailing in the internal combustion engine cylinder gas volume during slurry fuel injection thereinto.

f) The particular example contactor chamber pressure sensor and control, shown in FIG. 4, utilizes this control of the difference in atomizing gas flow rates, into and out of the contactor chamber, and comprises: a contactor chamber pressure sensor, 52, as input to a controller, 53, of work recovery engine flow rate of undissolved atomizing gas. The controller, 53, increases the flow rate of atomizing gas through the work recovery engine, 49, when sensed contactor chamber pressure exceeds the upper set value, and decreases this flow rate when contactor chamber pressure is below the lower set value. The atomizing gas pump, 45, for this FIG. 4 form of the invention is of fixed displacement volume per revolution of the pump. Both the atomizing gas pump, 45, and the work recovery engine, 49, rotate at an essentially constant multiple of engine crankshaft rotation. The controller, 53, can function to thusly control the flow rate of undissolved atomizing gas, through the work recovery engine, in various ways, as by controlling the gas pressure at inlet to the work recovery engine, or by controlling the duration of gas admission into the work recovery engine cylinder volume, or by controlling the displacement volume per revolution of the work recovery engine.

g) Alternatively, a contactor chamber pressure sensor and control means could use a fixed displacement volume per revolution work recovery engine, in combination with a control of the atomizing gas flow rate out of the atomizing gas compressor and into the contactor chamber.

E. The FIG. 5 Form of this Invention

The form of this invention, shown schematically in FIG. 5, utilizes a modified form of contactor chamber, 54, in order to assure incomplete gas saturation of the continuous water phase of the slurry fuel passing into the common rail, 10, and does not use a slurry fuel flow divider.

a) The contactor chamber, 54, is free of packing material, and equipped with an atomizing gas inlet distributor, 55, located below the slurry fuel level, 21, in the open contactor chamber. Atomizing gas from the source, 27, is pumped by the atomizing gas pump, 36, into the atomizing gas inlet distributor, 55, which distributes the gas as bubbles, 56, rising upward through the liquid slurry fuel. Undissolved portions of the atomizing gas leave the top of the upper portion, 17, of the contactor chamber, 54, via the exit flow restrictor, 33, and are discharged into the atmosphere, 42. The flow area of the exit flow restrictor, 33, is adjusted by the back pressure sensor and controller, 35, so as to maintain an essentially constant average contactor pressure, as described hereinabove for the FIG. 3 form of this invention.

b) The atomizing gas pump, 36, is similar to that described hereinabove, for the FIG. 3 form of the invention, and is not an adjustable flow rate atomizing gas pump.

c) The atomizing gas can be cooled while passing from the source, 27, into the contactor chamber, 54, as by use of cooling jackets and interstage intercoolers, 80, on the atomizing gas pump, 36, and by a postcooler, 30, on the pump outflow gas.

d) An undivided flow of slurry fuel is pumped by the slurry fuel pump, 12, from the slurry fuel source, 14, via the connection, 57, as a single flow, into the upper portion, 17, of the contactor chamber, via the inlet, 29.

e) The shorter the path length of the atomizing gas bubbles, 56, rising through the slurry fuel, in the contactor chamber, up to the slurry fuel level, 21, therein, the less contact area between atomizing gas and the water phase of the slurry fuel, and thus the less the degree of saturation of the continuous water phase with atomizing gas. In this way, by adjusting the slurry fuel level, 21, within the contactor chamber, incomplete saturation of the water phase of the slurry fuel can be obtained.

f) The adjustable level slurry fuel level sensors, 58, sense the slurry fuel level, 21, within the contactor chamber, 54, and are the input to the slurry fuel pump and driver control, 25, which operates to keep the slurry fuel level, 21, approximately constant between the two sensors, 58. These paired sensors, 58, can be adjusted up or down to adjust the slurry level, 21, up or down, and thus to adjust the degree of incomplete saturation of the water phase of the slurry fuel.

g) The degree of incomplete saturation of the liquid water phase, of the slurry fuel entering the common rail, can be increased by thusly shortening the path length, of the atomizing gas bubbles rising through the slurry fuel in the contactor chamber, 54. For best overall atomization, this bubble path length can be increased up to the point where erratic fuel metering commences due to slurry foaming.

F. Supplementary Atomizing Capacity

Primary atomization, by injection of the slurry into the compressed air in the cylinder gas volume, breaks up the slurry into many small slurry droplets, with each droplet containing many fuel particles. Within each slurry droplet, expansion of the dissolved atomizing gas, out of solution, separates these many fuel particles, thus accomplishing supplementary atomization. The extent of additional fuel particle separation, within each slurry droplet, is indicated by the supplementary atomizing index (SAI):

$$(SAI) = \frac{\text{(Atomizing Gas Volume Released)}}{\text{(Liquid Water Volume)}}$$

The volume of atomizing gas released after injection depends upon the amount of atomizing gas originally dissolved into the liquid water portion, of that one separate slurry fuel flow, directed into the upper portion of the contactor chamber, where the atomizing gas was dissolved thereinto at contactor pressure, and the lower pressure prevailing in the engine cylinder gas volume while slurry fuel is being injected. The liquid water volume is the combined, and interdiffused, water volume of both recombined total slurry fuel flows.

Approximate values for this supplementary atomizing index (SAI) can be estimated with the following relation for a pure atomizing gas, such as carbon dioxide:

$$SAI = \frac{(PC - PE)}{K}\frac{(TE)}{(PE)}(1923)\frac{(SDFR)}{(1 + SDFR)}$$

Wherein:

(PC)=Contactor chamber pressure, psia (PE)=Engine cylinder gas volume pressure at time of slurry injection, psia (TE)—Slurry temperature at injection, ° R;

(k)=Gas solubility coefficient as listed in the Handbook of Chemistry and Physics $$\text{Units of } (k) \text{ are } \frac{\text{(mmHg) (mols water)}}{\text{(mols gas dissolved)}}$$

$$(SDFR) = \text{(Slurry Divider Flow Ratio)}$$

$$(SDFR) = \frac{\text{(Slurry Flow Into Upper Contractor Chamber)}}{\text{(Slurry Flow Into Lower Contractor Chamber)}}$$

For a multicomponent atomizing gas, such as air or engine exhaust gas, this approximate relation becomes as follows:

$$SAI = \left[\left(\frac{Ca}{Ka}\right) + \left(\frac{Cb}{Kb}\right) + \left(\frac{Cc}{Kc}\right)\right]\left[\left(\frac{PC}{PE}\right) - 1\right](1923)(TE)\frac{(SDFR)}{(1 + SDFR)}$$

Wherein:

$C_a$=Mol fraction component a;

$K_a$=Gas solubility coefficient for component a;

And similarly for components b and c;

also $(C_a+C_b+C_c)=1.0$; all atomizing gas components are included.

These relations for (SAI) are definitely approximate for several reasons, of which the following are particularly relevant:

1) The gas solubility coefficients, k, from the International Critical Tables, and the Handbook of Chemistry and Physics, are at pressures very little different from one atmosphere, whereas the contactor chamber, and engine cylinder gas, pressures are of the order of 15 to 50 atmospheres. The simplifying assumption was here made that gas solubility increases linearly with pressure, and that the k values are constant at constant temperature.

2) The further assumption was made that the water portion of that one slurry fuel flow delivered into the upper portion of the contactor chamber to be in contact with atomizing gas became fully saturated with the atomizing gas.

3) The further approximation was made that slurry temperature at injection (TE) was very little different from that prevailing within the common rail prior to injection, and that heat transfer, from the hot cylinder gases, into the slurry droplet interior, was too slow to affect supplementary atomization. An arbitrary value of 545° R was selected for (TE).

Thusly estimated values of Max (SAI) are shown on FIG. 6 for a diesel engine of 14 to 1 compression ratio, and for various values of contactor chamber pressure (PC). At this engine compression ratio, and for slurry injection starting at about 20 to 30 degrees before piston top dead center, an approximate value of 400 psia was used for (PE). Calculated values of (SAI) are shown for three example atomizing gases: carbon dioxide; diesel engine exhaust gas at rated power output; and diesel engine exhaust gas enriched with an equal number of mols of carbon dioxide.

The enhanced supplementary atomizing capacity achieved by use of higher contactor chamber pressure, is necessarily accomplished with increased engine power and efficiency lost to driving the atomizing gas pump and compressor. This power loss can be approximated as the isentropic work of compressing the atomizing gas, from atmospheric up to contactor chamber pressure, and is herein expressed as the ratio of this work loss, to the fuel heating value, of the fuel portion of the total slurry fuel. For this approximate calculation the assumption was made that essentially all of the most soluble gas component was dissolved into the water portion of that one separate flow of slurry fuel, which was delivered into the upper portion of the contactor chamber, to be in contact with, and to dissolve, the atomizing gas. Thus the lower solubility gas components were compressed but only partially dissolved. The following approximate relation was used for estimates of the ratio of compressor work loss to fuel heating value.

$$\frac{\text{Compressor Work, Btu}}{\text{Fuel Heating Value, Btu}} = \left[\frac{(PC)(2.87)(hc-ho)(\text{lbs H}_2\text{O})(SDFR)}{(Ka)(LHV)(\text{lbs Fuel})(1+SDFR)}\right]$$

Wherein:
Compressor Work is in Btu;
Fuel Heating Value is in Btu for fuel lower heating value;
$(h_r-h_o)$=Isentropic work of compressing atomizing gas from atmospheric pressure up to contactor chamber pressure in Btu per lb mol of gas;
(LHV)=Lower heating value of the fuel component of the slurry, in Btu per lbmass of fuel $\frac{(\text{Lbs Fuel})}{(\text{Lbs H}_2\text{O})}$ = Weight ratio of fuel to liquid water in the slurry $(K_a)$ = Gas solubility coefficient of the most soluble component in the atomizing gas, $\frac{(\text{mmHg})(\text{mols water})}{(\text{mol gas})}$ Thusly estimated values of the ratio of compressor work loss to fuel heating value are shown on FIG. 7, for various atomizing gases and for various values of supplementary atomization index (SAI). The engine conditions and other assumptions used for the FIG. 6 estimated values were also used for these FIG. 7 calculations. Also a slurry weight ratio of fuel to water of 1.0 was assumed for FIG. 7. The advantages of carbon dioxide, as atomizing gas, are clearly shown in FIGS. 6 and 7, and result from its high water solubility. Also shown on FIG. 7 are similar estimated results for diesel engine exhaust gas as atomizing gas, with undissolved gases leaving the contactor chamber being expanded through an isentropic work recovery engine as for example in the FIG. 4 form of this invention.

Engine experiments can be used to ascertain the value of supplementary atomization index (SAI), needed to obtain the combustion and efficiency advantages, potentially available by preatomizing high viscosity, or solid, fuels into a preatomized fuel in water slurry. Even small values of (SAI) will yield some benefit, But (SAI) values, beyond the point where fuel particles within each slurry droplet remain fully separated during water evaporation, and subsequent fuel combustion, will likely yield little or no additional benefit. The best operating value of (SAI) will probably vary appreciably, for different engine bore, and different common rail fuel injection systems, as well as with different fuels, and extent of preatomization.

G. Details of Elements

The slurry transfer pump, 12, needs to be sized for maximum engine power output fuel flow rate, in the form of the slurry flow rate, to allow for the pumping of the water portion of the slurry.

$$(\text{Fuel Flow Rate}) = (\text{Maximum } BHP)(BSFC)$$

$$(\text{Slurry Flow Rate}) = (\text{Fuel Flow Rate})\left[1 + \frac{1}{\text{Slurry Ratio}}\right]$$

$$(\text{Slurry Ratio}) = \left(\frac{\text{lbs mass fuel}}{\text{lbs mass water}}\right)$$

Wherein:
(Maximum BHP)=Maximum engine brake horsepower;
(BSFC)=Engine brake specific fuel consumption at maximum power, lbsmass fuel per brake horsepower per hour;
(Fuel Flow Rate) in lbsmass fuel per hour;

The atomizing gas compressor, 26, 36, 45, can be sized to deliver at least sufficient gas into the contactor chamber, so that the supply of the maximum solubility component, of the atomizing gas, is sufficient to saturate the water portion of that one slurry fuel flow delivered into the upper contactor chamber:

$$\text{Atomizing Gas Flow Rate} = (AGFR); \text{lbmols/hr}$$

$$(AGFR) = \frac{(\text{Max } BHP)(BSFC)(PC)(2.87)(SDFR)}{(\text{Slurry Ratio})(Ka)(1+SDFR)}$$

The required volumetric pumping capacity of the atomizing gas compressor will depend upon the pressure and temperature of the gas, as supplied to the intake of the compressor, and the volumetric efficiency of the compressor.

Multistage atomizing gas compressors will usually be preferred, as allowing the use of intercoolers between stages to reduce the work of compression.

A tall contactor chamber, 9, and with counterflow of slurry fuel downward, and atomizing gas upward, is preferred. Various methods of increasing the area of contact between slurry water and atomizing gas can be used such as the following:

(a) Many small atomizing gas bubbles rising through the liquid slurry are shown in FIG. 5;
(b) Chunks of packing material, over whose large exterior surface area the slurry fuel is spread, is shown in FIG. 2;
(c) Other forms of rectifying column can also be used, such as bubble plates, and as illustrated in the reference, "Principles of Chemical Engineering," Walker, Lewis, McAdams, and Gilliland;

For the purposes of this invention, essentially full common rail pressure is to prevail along essentially the entire fuel path, through the common rail fuel injection system, up to the upstream side of the final fuel injector valve seat, to avoid the slurry foaming. Early mechanical common rail fuel injection systems operated in this manner, with full common rail pressure acting consistently up to the single fuel injection value. This early system required a reliable and durable fuel injector valve, to avoid continuous fuel leakage into the engine cylinder. Many modern common rail fuel injection systems interpose an additional on-off pressure valve, for each fuel injector, between the common rail and the final fuel injector valve. The on-off pressure valve applies common rail pressure to the final fuel injector valve, only when fuel injection is to occur into the engine cylinder. In this way the on-off valve acts to greatly reduce the likelihood of continuous fuel leakage into the engine cylinder.

An illustrative example form of fuel injection nozzle with double valves, suitable for use with the common rail fuel injection system of this invention, is shown schematically in FIG. 8, and comprises the following elements. The injector valve, 60, seats at, 61, against the nozzle housing, 62, when closed. The cylindrical on-off pressure valve, 63, seats at, 64, against the nozzle housing, 62, when closed. Common rail pressure is applied via the passage, 65. The injector valve, 60, and on-off pressure valve, 63, can be separately driven to open and close by various types of valve drivers, including solenoid and spring drivers, piezoelectric drivers, hydraulic drivers, mechanical drivers, and combinations of such drivers, and these drivers are not shown in FIG. 7.

This example fuel injector nozzle can operate as follows. At the start of fuel injection into the engine cylinder volume the on-off pressure valve, 63, is opened and subsequently the injector valve, 60, is opened, and common rail pressure then causes fuel to be injected into the engine cylinder volume, 4, via the nozzle hole, 66. When fuel injection is to stop the on-off pressure valve, 63, is closed and subsequently the injector valve, 60, is closed, and the residual fuel within the trapped volume, 67, is left at the reduced pressure within the engine cylinder volume, 4. In this way, unwanted dribbling of fuel into the engine cylinder volume, 4, when both the injector valve, 60, and the on-off pressure valve, 63, are closed, can only occur when both of these valves are leaking. The residual fuel, within the trapped volume, 67, when depressurized, will have lost much of its dissolved atomizing gas. When subsequently injected into the engine cylinder volume, on the next engine cycle, this residual fuel quantity will receive little or no supplementary atomization. For this reason the trapped volume, 67, is preferably to be minimized, with a short length, and minimum but functional radial thickness.

Various types of slurry flow divider, 15, can be used, one example type being shown schematically in FIG. 9. The total slurry flow from the slurry pump, 12, enters the slurry flow divider, 15, via the entry pipe, 20, and is divided into a one separate slurry flow into the upper portion, 17, of the contactor chamber via upper pipe, 16, and another separate slurry flow into the lower portion, 19, of the contactor chamber via lower pipe, 18. The slurry divider flow ratio (SDFR), of the one slurry flow rate into the upper portion of the contactor chamber, divided by the other slurry flow into the lower portion of the contactor chamber, can be adjusted by moving the flow ratio adjuster, 70, in the direction, 71, to increase the value of (SDFR) by increasing the flow area of the upper flow restrictor, 72, and concurrently decreasing the flow area of the lower flow restrictor, 73, by action of the double tapered portions of the flow ratio adjuster, 70. In like manner the value of (SDFR) can be decreased by moving the flow ratio adjuster, 70, in the direction, 74.

Another example slurry flow divider, 15, is shown schematically in FIG. 10. The total slurry flow from slurry pump, 12, enters the slurry flow divider, 15, via the entry pipe, 20, and is divided into a one separate slurry flow into the upper portion, 17, of the contactor chamber, via upper pipe, 16, fitted with an upper on-off valve, 75, and upper valve driver, 76; and another separate slurry flow into the lower portion, 19, of the contactor chamber, via lower pipe, 18, fitted with a lower on-off valve, 77, and lower valve driver, 78. The valve timer, 79, operates the valve drivers, 76, 78, cyclically, so that when the upper on-off valve is open, the lower on-off valve is closed, and vice versa. The relative duration of valve openings can be adjusted, in the timer, 79, to adjust the slurry divider flow ratio (SDFR). Thus a higher value of (SDFR) can be obtained by increasing the duration of opening of the upper on-off valve, 75, and concurrently decreasing the duration of opening of the lower on-off valve, 77, during each cycle. This cyclic operation of the on-off valves, 75, 77, creates a pulsed flow of slurry fuel into the contactor chamber. Where a positive displacement slurry pump, 12, is used, either one or both of the on-off valves is fitted to not close fully, so that a flow passage always exists for the total slurry flow. Alternatively the on-off valves, 75, 77, can be timed to be opening and closing concurrently, to provide the needed continuous flow passage.

Adjustment of the operating value of the slurry divider flow ratio, (SDFR), can be done by hand adjustment of the valve timer, 79, or by a controller, responsive to one or more sensors of engine operating condition.

H. Industrial Uses of this Invention

The residual fuel content of newly discovered crude oils has tended to increase with the passage of time. Indeed, some newer oil fields, such as the Athabaska tar sands, yield a crude oil which is essentially wholly residual fuel. Currently, direct transport use of these high viscosity residual fuels is confined to large bore, slow speed, marine diesel engines. Other transport engines currently require use of distillate petroleum fuels, which are expensive and in progressively shorter supply. Such distillate petroleum fuels can be prepared from residual portions of crude oil, but stock and hence energy losses result.

Preatomization of residual fuels, as also coal or coke fuels, into a fuel particle in water slurry, appears a promising means for utilizing residual fuels in smaller bore, higher speed, diesel engines. These smaller bore, higher speed diesel engines are the major power source for the critical transport portion of our economy, and are currently a major consumer of the limited supplies of expensive distillate petroleum fuels.

Residual petroleum fuels are currently used in industrial furnaces and steam boiler furnaces. But these stationary fuel uses can be more readily adapted to use of lower cost and widely available coal than can transport industry engines. In this way, wider use of residual petroleum fuel in the critical transport industry can contribute to achieving national energy independence.

Recent efforts to derive fuels, suitable for use in piston internal combustion engines, from farm crop materials, have been directed toward liquid fuels, such as ethanol, and modified vegetable oils. Only the small food portion of the total crop cellulose product is used to create an even smaller yield of ethanol or vegetable oil. Preferably the usual farm cellulose product could be divided into three portions: a food portion for human and livestock consumption; a fertilizer portion to maintain soil fertility; and a fuel portion to be shredded, and blended into a slurry fuel. In this way a greater yield of energy product per acre of farmland, could be realized, without impairing the yield of food product.

Many slurry fuel combinations, as well as non slurry fuels, can be efficiently used in diesel engines equipped with the supplementary atomizer apparatus of this invention, of which the following are examples:

(a) A two component slurry of, small particles of residual petroleum fuel, suspended in a continuous water phase;

(b) A three component slurry of; small particles of residual fuel, plus separate small particles of igniter fuel, such as high cetane number distillate petroleum fuel, suspended in a continuous water phase. Such use of igniter fuel could decrease excess fuel penetration by shortening the ignition delay time interval;

(c) A four component slurry of, small particles of residual petroleum fuel containing finely shredded farm cellulose particles, plus separate small particles of igniter fuel, suspended in a continuous water phase. For this four component slurry the atomizing gas could advantageously comprise gas portions soluble in the residual petroleum fuel, such as natural gas, as well as gas components soluble in the water phase, such as carbon dioxide. The resulting supplementary atomization of the residual fuel particles would create improved oxygen access to the farm cellulose particles;

(d) Another four component slurry of small particles of residual petroleum fuel containing finely divided coal particles, plus separate small particles of igniter fuel, suspended in a continuous water phase. Again the preferred atomizing gas comprises gases soluble in residual petroleum fuel, as well as gases soluble in water. The adverse wear of fuel injector valves, observed earlier with coal particle in water slurries, may be reduced, or eliminated, by coating the coal particles with residual petroleum fuel.

(e) A two component slurry of finely shredded farm cellulose particles suspended in a continuous distillate petroleum fuel phase. A petroleum soluble gas, such as natural gas, could be used as the atomizing gas;

These example slurries are gas dissolving fluids, with some portions being non gaseous fuels, and with some portions being capable of dissolving gases. Portions of the atomizing gases, used with these gas dissolving fluids, are soluble in portions of the gas dissolving fluid.

Various types of slurrifiers, such as the examples listed hereinabove, can be used in direct combination with internal combustion engines equipped with common rail supplementary atomizer apparatus of this invention. Alternatively, the slurry fuels can be prepared at a central refueling facility serving several separate engines.

An internal combustion engine, with the common rail supplementary atomizer of this invention, can also be operated efficiently on conventional distillate petroleum fuels, as well as on these slurry fuels. This multifuel capability of these engines is a substantial benefit for transportation engine uses in today's uncertain and volatile fuels markets.

Having described my invention, what I claim is:

1. The combination of a piston internal combustion engine with a common rail supplementary atomizer;

wherein said piston internal combustion engine comprises: a crankshaft; at least one piston and cylinder, each said piston and cylinder enclosing a cylinder gas volume; an exhaust system for discharging burned exhaust gas from said cylinder gas volume;

wherein said common rail supplementary atomizer comprises:

a contactor chamber for contacting slurry fuel with atomizing gas and comprising an upper portion and a lower portion, these portions being flow connected together;

a common rail distribution system for injecting slurry fuel into each cylinder gas volume, said common rail being free flow connected to the bottom of the lower portion of said contactor chamber;

a source of slurry fuel and comprising non gaseous fuel particles suspended in a continuous liquid water phase;

a source of atomizing gas, at least some portions of which are at least moderately soluble, and preferably highly soluble, in liquid water;

slurry fuel pump and driver means for transferring slurry fuel, from said source of slurry fuel, into said contactor chamber, and comprising a slurry fuel flow divider for dividing said transferring slurry fuel into two separate flows of slurry fuel, one said separate flow of slurry fuel being transferred into said upper portion of said contactor chamber, the other said separate flow of slurry fuel being transferred into said lower portion of said contactor chamber;

slurry fuel level sensor means for sensing the level of slurry fuel within said contactor chamber;

slurry fuel pump and driver control means for controlling the rate of transfer of slurry fuel, from said source of slurry fuel, into said contactor chamber, responsive to said slurry fuel level sensor; and operative to; keep the lower portion of said contactor chamber full of slurry fuel, and, keep the level of slurry fuel below the upper portion of said contactor chamber;

wherein said slurry level sensor means, and said slurry pump and driver control means, can be any one of the options: hand sensor and control means; automatic sensor and control means; and, a combination of hand and automatic sensor and control means;

whereby slurry fuel flows, from said source of slurry fuel, into said contactor chamber, in two separate flows, that one separate flow into the upper portion of said contactor chamber flowing downward through said contactor chamber to rejoin, and blend with that other separate flow into the lower portion of said contactor chamber, and this combined slurry fuel flows into said common rail distribution system, and is injected therefrom into said cylinder gas volumes of said internal combustion engine;

atomizing gas transfer means for transferring atomizing gas, from said source of atomizing gas, into said contactor chamber, at a level within said contactor chamber, well below the level at which one said separate flow of slurry fuel is transferred into said upper portion of said contactor chamber, and at a level within said contactor chamber above the level at which said other separate flow of slurry fuel is transferred into said lower portion of said contactor chamber;

contactor chamber pressure sensor and control means for maintaining the gas pressure, in said upper portion of said contactor chamber, essentially constant, about an average contactor chamber pressure, less than an upper set value of contactor chamber gas pressure, and greater than a lower set value of contactor chamber gas pressure, said control means being responsive to said contactor chamber pressure sensor, and operative to adjust the difference quantity of, the flow rate of atomizing gas into said contactor chamber, minus the flow rate of atomizing gas in gaseous form out of said contactor chamber, increasing said difference quantity when said sensed contactor pressure is less than said lower set value, and decreasing said difference quantity when said sensed contactor chamber pressure is greater than said upper set value;

wherein said average contactor chamber pressure is controlled to be sufficiently greater than the pressures prevailing in said cylinder gas volumes, of said internal combustion engine, as to assure adequate slurry fuel primary atomization into droplets when injected into said cylinder gas volumes;

wherein said contactor chamber pressure sensor and control means can be any one of the options; hand sensor and control means; automatic sensor and control means; and a combination of hand and automatic sensor and control means;

and further wherein the pressure prevailing, within said common rail distribution system, is essentially the same as said contactor chamber pressure, and is essentially fully applied along essentially the full length of the slurry fuel flow path within said common rail distribution system, up to said cylinder gas volume;

whereby atomizing gas flows, from said source of atomizing gas, into said contactor chamber, countercurrent to said downward flow of said one separate flow of slurry fuel, which was transferred into said upper portion of said contactor chamber, and at least portions of said atomizing gas are dissolved into the water portion of that one separate flow of slurry fuel, and this one separate flow of slurry fuel becomes at least partially saturated with soluble portions of said atomizing gas;

and further whereby said one separate flow of slurry fuel, transferred into the upper portion of said contactor chamber, and becoming at least partially saturated with atomizing gas therein, is subsequently blended with that other separate flow of slurry fuel, transferred into the lower portion of said contactor chamber, and not contacted with atomizing gas, and this recombined flow of slurry fuel is less than saturated with atomizing gas;

and further whereby said recombined flow of slurry fuel, with dissolved portions of atomizing gas, flows into said common rail distribution system, and is injected into the cylinder gas volumes of said piston internal combustion engine, where, at the lower pressures prevailing in said cylinder gas volume, said dissolved atomizing gas expands out of solution from the water portion of said slurry fuel, and separates the fuel particles, within each slurry droplet, into separated fuel particles, thus increasing the fuel surface available for fuel burning, and hence the rate and completeness of fuel combustion within each cylinder gas volume of said piston internal combustion engine.

2. A combination of a piston internal combustion engine with a common rail supplementary atomizer, as described in claim 1:

wherein said contactor chamber pressure sensor and control means comprises:
  a receiver of discharged atomizing gas, which is the atmosphere;
  gas exit flow restrictor means for discharging a restricted exit flow of gas from the top of the upper portion of said contactor chamber, and into said receiver of discharged atomizing gas;

whereby atomizing gas flows upward through said contactor chamber, countercurrent to said downward flow of that one separate flow of slurry fuel, transferred into said upper portion of said contactor chamber, and non dissolved portions of said atomizing gas throughflow are discharged from the top of said contactor chamber via said gas exit flow restrictor;

wherein said contactor chamber pressure sensor and control means further comprises: a sensor of contactor chamber pressure; a contactor chamber back pressure control means for adjusting the gas flow area of said gas flow restrictor means, responsive to said contactor chamber pressure sensor, and operative to, increase said gas flow area when sensed contactor chamber pressure exceeds said upper set value of contactor chamber pressure, and to decrease said gas flow area when sensed contactor chamber pressure is less than said lower set value of contactor chamber pressure.

3. A combination of a piston internal combustion engine with a common rail supplementary atomizer, as described in claim 2:

wherein said atomizing gas transfer means comprises rotary atomizing gas pump and driver means for transferring atomizing gas from said source into said contactor chamber, said pump being driven by the crankshaft of said internal combustion engine, with pump revolutions per unit of time being an essentially constant multiple of engine crankshaft revolutions per unit of time, and with pump displacement volume per pump revolution being essentially constant;

and further wherein said atomizing gas transfer means comprises gas cooling means for cooling said atomizing gas during said transfer from said source of atomizing gas into said contactor chamber.

4. A combination of a piston internal combustion engine with a common rail supplementary atomizer, as described in claim 1:

wherein said contactor chamber pressure sensor and control means comprises;
a gas exit flow restrictor means for discharging a restricted exit flow of undissolved atomizing gas, from the top of the upper portion of said contactor chamber, and into the atmosphere as a receiver of discharged atomizing gas;

wherein said atomizing gas transfer means comprises adjustable flow rate atomizing gas pump and driver means for transferring atomizing gas, from said source of atomizing gas, into said contactor chamber:

wherein said contactor chamber pressure sensor and control means further comprises atomizing gas pump and driver control means for controlling said adjustable gas flow rate, responsive to said contactor chamber pressure sensor, and operative to; increase the rate of transfer of atomizing gas into said contactor chamber when contactor chamber pressure is less than said lower set value of contactor chamber pressure, and to decrease the rate of transfer of atomizing gas into said contactor chamber when said contactor chamber pressure is greater than said upper set value of contactor chamber pressure;

whereby atomizing gas, flows upward through said contactor chamber, countercurrent to said downward flow of that one separate flow of slurry fuel transferred into said upper portion of said contactor chamber, and non dissolved portions of said atomizing gas throughflow are discharged from the top of said contactor chamber via said gas exit flow restrictor.

5. A combination of a piston internal combustion engine with a common rail supplementary atomizer as described in claim 1, and further comprising:
a receiver of discharged and expanded atomizing gas which is the atmosphere;
contactor chamber pressure sensor means for sensing the pressure in said contactor chamber;
an atomizing gas discharge flow connection from the top of said upper portion of said contactor chamber;
wherein said contactor chamber pressure control means for maintaining the pressure in said contactor chamber, essentially constant, comprises a combination of: a work recovery engine means for recovering gas expansion work from those atomizing gas portions being discharged from said contactor chamber via said discharge flow connection; and said atomizing gas pump and driver means for transferring atomizing gas from said source of atomizing gas into said contactor chamber;
a contactor chamber pressure control means for maintaining the gas pressure in said contactor chamber essentially constant, about an average contactor chamber pressure, less than an upper set value of contactor chamber gas pressure, and greater than a lower set value of contactor chamber pressure, and operative by adjusting the difference quantity of, the flow rate of atomizing gas into said contactor chamber, via said atomizing gas pump and driver, minus the flow rate of atomizing gas, in gaseous form, out of said contactor chamber, via said work recovery engine, increasing said difference quantity when said average contactor chamber pressure is less than said lower set value, and decreasing said difference quantity when said average contactor chamber pressure is greater than said upper set value;

wherein said work recovery engine comprises, a gas flow inlet connected to said atomizing gas discharge flow connection from said contactor chamber, a gas flow outlet connection to said receiver of discharged and expanded atomizing gas, and a recovered work output connection to said internal combustion engine;

and further wherein said atomizing gas pump and driver means for transferring atomizing gas comprises means for cooling said atomizing gas during said transfer from said source into said contactor chamber.

6. A combination of a piston internal combustion engine with a common rail supplementary atomizer, as described in claim 5:

wherein said atomizing gas pump and driver means for transferring atomizing gas from said source of atomizing gas, into said contactor chamber, is driven by the internal combustion engine crankshaft, at an essentially constant multiple of engine crankshaft revolutions per unit of time, and mechanically displaces an essentially constant volume per revolution of the pump;

wherein said work recovery engine means is of the positive displacement type, comprising a work output shaft, and with a constant engine mechanical displacement volume per revolution of said work output shaft;

and further wherein the work output shaft, of said work recovery engine, is directly coupled to the crankshaft of said internal combustion engine and rotates at an essentially constant multiple of engine crankshaft revolutions per unit of time;

wherein said contactor chamber pressure control means, for maintaining an essentially constant contactor chamber pressure, is one chosen from the group of contactor chamber pressure control means consisting of: an atomizing gas pump flow control means for controlling the flow rate of atomizing gas into said contactor chamber, in combination with a fixed volumetric flow rate per revolution work recovery engine; and, a work recovery engine flow control means for controlling the flow rate of discharged atomizing gas out of said contactor chamber, in combination with a fixed volumetric flow rate per revolution atomizing gas pump and driver.

7. The combination of a piston internal combustion engine with a common rail supplementary atomizer;

wherein said piston internal combustion engine comprises: a crankshaft; at least one piston and cylinder, each said piston and cylinder enclosing a cylinder gas volume; an exhaust system for discharging burned exhaust gas from said cylinder gas volume;

wherein said common rail supplementary atomizer comprises:

a contactor chamber for contacting slurry fuel with atomizing gas, and comprising an upper portion and a lower portion, these portions being flow connected together;

a common rail distribution system for injecting slurry fuel into each cylinder gas volume, said common rail being free flow connected to the bottom of the lower portion of said contactor chamber;

a source of slurry fuel comprising non gaseous fuel particles suspended in a continuous liquid water phase;

a source of atomizing gas, at least some portions of which are at least moderately soluble, and preferably highly soluble, in liquid water;

slurry fuel pump and driver means for transferring slurry fuel, from said source of slurry fuel, into said contactor chamber, and into said upper portion of said contactor chamber;

slurry fuel level sensor means for sensing the level of slurry fuel within said contactor chamber;

slurry fuel pump and driver control means for controlling the rate of transfer of slurry fuel, from said source of slurry fuel, into said contactor chamber, responsive to said slurry fuel level sensor, and operative to; keep the lower portion of said contactor chamber full of slurry fuel, and, keep the level of slurry fuel below the upper portion of said contactor chamber;

wherein said slurry level sensor means, and said slurry pump and driver control means, can be any one of the options: hand sensor and control means; automatic sensor and control means; and, a combination of hand and automatic sensor and control means;

whereby slurry fuel flows downward through said contactor chamber into said lower portion thereof and into said common rail distribution system and is injected therefrom into said cylinder gas volumes of said internal combustion engine;

atomizing gas transfer means for transferring atomizing gas, from said source of atomizing gas, into said contactor chamber, and into the bottom of the lower portion of said contactor chamber, and thus below the level of slurry fuel within said contactor chamber;

contactor chamber pressure sensor and control means for maintaining the gas pressure, in said upper portion of said contactor chamber, essentially constant about an average contactor chamber pressure, less than an upper set value of contactor chamber gas pressure, and greater than a lower set value of contactor chamber pressure, and comprising:

a sensor of contactor chamber pressure;

gas exit flow restrictor means for discharging a restricted exit flow of undissolved atomizing gas from the top of the upper portion of said contactor chamber and into the atmosphere as a receiver of discharged atomizing gas;

back pressure control means for adjusting the gas flow area of said gas flow restrictor means, responsive to said contactor chamber pressure sensor, and operative to; increase said gas flow area when sensed contactor chamber pressure exceeds said upper set value of contactor chamber pressure, and to decrease said gas flow area when sensed contactor chamber pressure is less than said lower set value of contactor chamber pressure;

wherein said average contactor chamber pressure is controlled to be sufficiently greater than the pressures prevailing in said cylinder gas volumes of said internal combustion engine, as to assure adequate slurry fuel primary atomization into slurry droplets when injected into said cylinder gas volumes;

wherein said contactor chamber pressure sensor and control means can be any one of the options: hand sensor and control means; automatic sensor and control means; and a combination of hand and automatic sensor and control means;

and further wherein the pressure prevailing, within said common rail distribution system, is essentially the same as said contactor chamber pressure, and is essentially fully applied along essentially the full length of the slurry fuel flow path within said common rail distribution system, up to said cylinder gas volume;

whereby atomizing gas flows, from said source of atomizing gas, into said contactor chamber, below the level of slurry fuel therein, and rises, as bubbles, countercurrent to the downward flow of slurry fuel therethrough, and portions of said atomizing gas are dissolved into the water portion of said slurry fuel, which becomes partially saturated with soluble portions of said atomizing gas;

and further whereby said flow of slurry fuel, with dissolved portions of atomizing gas, flows into said common rail distribution system, and is injected into the cylinder gas volumes of said piston internal combustion engine, where, at the lower pressures prevailing in said cylinder gas volume, said dissolved atomizing gas expands out of solution from the water portion of said slurry fuel, and separates the fuel particles, within each slurry droplet, into separated fuel particles, thus increasing the fuel surface available for fuel burning, and hence the rate and completedness of fuel combustion within each cylinder gas volume of said piston internal combustion engine.

8. The combination of a piston internal combustion engine with a common rail supplementary atomizer as described in claim 7:

wherein said slurry fuel level sensor means is adjustable to adjust the level of slurry fuel within said contactor chamber.

9. The combination of a piston internal combustion engine with a common rail supplementary atomizer:

wherein said piston internal combustion engine comprises: a crankshaft; at least one piston and cylinder, each said piston and cylinder enclosing a cylinder gas volume; an exhaust system for discharging burned exhaust gas from said cylinder gas volume;

wherein said common rail supplementary atomizer comprises:

a contactor chamber for contacting gas dissolving fluid with atomizing gas, and comprising an upper portion and a lower portion, these portions being flow connected together;

a common rail distribution system for injecting gas dissolving fluid into each cylinder gas volume, said common rail being free flow connected to the bottom of the lower portion of said contactor chamber;

a source of gas dissolving fluid, at least some portions of which are a combustible non gaseous fuel and at least portions of which are capable of dissolving some gases;

a source of atomizing gas, at least some portions of which are soluble, in at least portions of said gas dissolving fluid;

gas dissolving fluid pump and driver means for transferring gas dissolving fluid from said source of gas dissolving fluid, into said contactor chamber, and comprising a gas dissolving fluid flow divider for dividing said transferring gas dissolving fluid into two separate flows of gas dissolving fluid, one said separate flow of gas dissolving fluid being transferred into said upper portion of said contactor chamber, the other said separate flow of gas dissolving fluid being transferred into said lower portion of said contactor chamber;

gas dissolving fluid level sensor means for sensing the level of gas dissolving fluid within said contactor chamber;

gas dissolving fluid pump and driver control means for controlling the rate of transfer of gas dissolving fluid from said source of gas dissolving fluid into said contactor chamber, responsive to said gas dissolving fluid level sensor, and operative to; keep the lower portion of said contactor chamber full of gas dissolving fluid, and, keep the level of gas dissolving fluid below the upper portion of said contactor chamber;

wherein said gas dissolving fluid level sensor means, and said gas dissolving fluid pump and driver control means, can be any one of the options: hand sensor and control means; automatic sensor and control means; and, a combination of hand and automatic sensor and control means;

whereby gas dissolving fluid flows, from said source of gas dissolving fluid, into said contactor chamber, in two separate flows, that one separate flow into the upper portion of said contactor chamber flowing downward through said contactor chamber to rejoin, and blend with that other separate flow into the lower portion of said contactor chamber, and this combined gas dissolving fluid flows into said common rail distribution system, and is injected therefrom into said cylinder gas volumes of said internal combustion engine;

atomizing gas transfer means for transferring atomizing gas, from said source of atomizing gas, into said contactor chamber, at a level within said contactor chamber well below the level at which one said separate flow of gas dissolving fluid is transferred into said upper portion of said contactor chamber, and at a level within said contactor chamber above the level at which said other separate flow of gas dissolving fluid is transferred into said lower portion of said contactor chamber;

contactor chamber pressure sensor and control means for maintaining the gas pressure, in said upper portion of said contactor chamber, essentially constant, about an average contactor chamber pressure, less than an upper set value of contactor chamber gas pressure, and greater than a lower set value of contactor chamber gas pressure, said control means being responsive to said contactor chamber pressure sensor, and operative to adjust the difference quantity of, the flow rate of atomizing gas into said contactor chamber, minus the flow rate of atomizing gas in gaseous form out of said contactor chamber, increasing said difference quantity when said sensed contactor pressure is less than said lower set value, and decreasing said difference quantity when said sensed contactor chamber pressure is greater than said upper set value;

wherein said average contactor chamber pressure is controlled to be sufficiently greater than the pressure prevailing in said cylinder gas volumes, of said internal combustion engine, as to assure adequate gas dissolving fluid primary atomization into droplets when injected into said cylinder gas volumes;

wherein said contactor chamber pressure sensor and control means can be any one of the options: hand sensor and control means; automatic sensor and control means; and a combination of hand and automatic sensor and control means;

and further wherein the pressure prevailing, within said common rail distribution system, is essentially the same as said contactor chamber pressure, and is essentially fully applied along essentially the full length of the gas dissolving fluid flow path within said common rail distribution system, up to said cylinder gas volume;

whereby atomizing gas flows, from said source of atomizing gas, into said contactor chamber, countercurrent to said downward flow of said one separate flow of gas dissolving fluid, which was transferred into said upper portion of said contactor chamber, and at least portions of said atomizing gas are dissolved into a portion of that one separate flow of gas dissolving fluid, and this one separate flow of gas dissolving fluid becomes at least partially saturated with soluble portions of said atomizing gas;

and further whereby said one separate flow of gas dissolving fluid, transferred into the upper portion of said contactor chamber, and becoming at least partially saturated with atomizing gas therein, is subsequently blended with that other separate flow of gas dissolving fluid, transferred into the lower portion of said contactor chamber, and not contacted with atomizing gas, and this recombined flow of gas dissolving fluid is less than saturated with atomizing gas;

and further whereby said recombined flow of gas dissolving fluid, with dissolved portions of atomizing gas, flows into said common rail distribution system, and is injected into the cylinder gas volumes of said piston internal combustion engine, where, at the lower pressures prevailing in said cylinder gas volume, said dissolved atomizing gas expands out of solution from said gas dissolving fluid, and breaks up the gas dissolving fluid droplets, thus increasing the surface available for fuel burning, and hence the rate and completeness of fuel combustion within each cylinder gas volume of said piston internal combustion engine.

10. A combination of a piston internal combustion engine with a common rail supplementary atomizer, as described in claim 9:

wherein said contactor chamber pressure sensor and control means comprises:
a receiver of discharged atomizing gas, which is the atmosphere;
gas exit flow restrictor means for discharging a restricted exit flow of gas from the top of the upper portion of said contactor chamber, and into said receiver of discharged atomizing gas;

whereby atomizing gas flows upward through said contactor chamber, countercurrent to said downward flow of that one separate flow of gas dissolving fluid transferred into said upper portion of said contactor chamber, and non dissolved portions of said atomizing gas throughflow are discharged from the top of said contactor chamber via said gas exit flow restrictor;

wherein said contactor chamber pressure sensor and control means further comprises: a sensor of contactor chamber pressure; a contactor chamber back pressure control means for adjusting the gas flow area of said gas flow restrictor means, responsive to said contactor chamber pressure sensor, and operative to, increase said gas flow area when sensed contactor chamber pressure exceeds said upper set value of contactor chamber pressure, and to decrease said gas flow area when sensed contactor chamber pressure is less than said lower set value of contactor chamber pressure.

11. A combination of a piston internal combustion engine with a common rail supplementary atomizer as described in claim 10:

wherein said atomizing gas transfer means comprises rotary atomizing gas pump and driver means for transferring atomizing gas from said source into said contactor chamber, said pump being driven by the crankshaft of said internal combustion engine, with pump revolutions per unit of time being an essentially constant multiple of engine crankshaft revolutions per unit of time, and with pump displacement volume per pump revolution being essentially constant;

and further wherein said atomizing gas transfer means comprises gas cooling means for cooling said atomizing gas during said transfer from said source of atomizing gas into said contactor chamber.

12. A combination of a piston internal combustion engine with a common rail supplementary atomizer as described in claim 9:

wherein said contactor chamber pressure sensor and control means comprises;
a gas exit flow restrictor means for discharging a restricted exit flow of undissolved atomizing gas, from the top of the upper portion of said contactor chamber, and into the atmosphere as a receiver of discharged atomizing gas;

wherein said atomizing gas transfer means comprises adjustable flow rate atomizing gas pump and driver means for transferring atomizing gas, from said source of atomizing gas, into said contactor chamber:

wherein said contactor chamber pressure sensor and control means further comprises atomizing gas pump and driver control means for controlling said adjustable gas flow rate, responsive to said contactor chamber pressure sensor, and operative to; increase the rate of transfer of atomizing gas into said contactor chamber when contactor chamber pressure is less than said lower set value of contactor chamber pressure, and to decrease the rate of transfer of atomizing gas into said contactor chamber when said contactor chamber pressure is greater than said upper set value of contactor chamber pressure;

whereby atomizing gas flows upward through said contactor chamber, countercurrent to said downward flow of that one separate flow of gas dissolving fluid transferred into said upper portion of said contactor chamber, and non dissolved portions of said atomizing gas throughflow are discharged from the top of said contactor chamber via said gas exit flow restrictor.

13. A combination of a piston internal combustion engine with a common rail supplementary atomizer, as described in claim 9, and further comprising:
- a receiver of discharged and expanded atomizing gas which is the atmosphere;
- contactor chamber pressure sensor means for sensing the pressure in said contactor chamber;
- an atomizing gas discharge flow connection from the top of said upper portion of said contactor chamber;
- wherein said contactor chamber pressure control means for maintaining the pressure in said contactor chamber, essentially constant, comprises a combination of: a work recovery engine means for recovering gas expansion work from those atomizing gas portions being discharged from said contactor chamber via said discharge flow connection; and said atomizing gas pump and driver means for transferring atomizing gas from said source of atomizing gas into said contactor chamber;
- a contactor chamber pressure control means for maintaining the gas pressure in said contactor chamber essentially constant, about an average contactor chamber pressure, less than an upper set value of contactor chamber gas pressure, and greater than a lower set value of contactor chamber pressure, and operative by adjusting the difference quantity of, the flow rate of atomizing gas into said contactor chamber, via said atomizing gas pump and driver, minus the flow rate of atomizing gas, in gaseous form, out of said contactor chamber, via said work recovery engine, increasing said difference quantity when said average contactor chamber pressure is less than said lower set value, and decreasing said difference quantity when said average contactor chamber pressure is greater than said upper set value;
- wherein said work recovery engine comprises, a gas flow inlet connected to said atomizing gas discharge flow connection from said contactor chamber, a gas flow outlet connection to said receiver of discharged and expanded atomizing gas, and a recovered work output connection to said internal combustion engine;
- and further wherein said atomizing gas pump and driver means for transferring atomizing gas comprises means for cooling said atomizing gas during said transfer from said source into said contactor chamber.

14. A combination of a piston internal combustion engine with a common rail supplementary atomizer, as described in claim 13:
- wherein said atomizing gas pump and driver means for transferring atomizing gas from said source of atomizing gas, into said contactor chamber, is driven by the internal combustion engine crankshaft, at an essentially constant multiple of engine crankshaft revolutions per unit of time, and mechanically displaces an essentially constant volume per revolution of the pump;
- wherein said work recovery engine means is of the positive displacement type, comprising a work output shaft, and with a constant engine mechanical displacement volume per revolution of said work output shaft;
- and further wherein the work output shaft, of said work recovery engine, is directly coupled to the crankshaft of said internal combustion engine and rotates at an essentially constant multiple of engine crankshaft revolutions per unit of time;
- wherein said contactor chamber pressure control means, for maintaining an essentially constant contactor chamber pressure, is one chosen from the group of contactor chamber pressure control means consisting of: an atomizing gas pump flow control means for controlling the flow rate of atomizing gas into said contactor chamber, in combination with a fixed volumetric flow rate per revolution work recovery engine; and, a work recovery engine flow control means for controlling the flow rate of discharged atomizing gas out of said contactor chamber, in combination with a fixed volumetric flow rate per revolution atomizing gas pump and driver.

15. The combination of a piston internal combustion engine with a common rail supplementary atomizer:
- wherein said piston internal combustion engine comprises: a crankshaft; at least one piston and cylinder, each said piston and cylinder enclosing a cylinder gas volume; an exhaust system for discharging burned exhaust gas from said cylinder gas volume;
- wherein said common rail supplementary atomizer comprises:
- a contactor chamber for contacting gas dissolving fluid with atomizing gas, and comprising an upper portion and a lower portion, these portions being flow connected together;
- a common rail distribution system for injecting gas dissolving fluid into each cylinder gas volume, said common rail being free flow connected to the bottom of the lower portion of said contactor chamber;
- a source of gas dissolving fluid, at least some portions of which are a combustible non gaseous fuel, at least portions of which are capable of dissolving some gases;
- a source of atomizing gas, at least some portions of which are soluble, in at least portions of said gas dissolving fluid;
- gas dissolving fluid pump and driver means for transferring gas dissolving fluid, from said source of gas dissolving fluid, into said contactor chamber, and into said upper portion of said contactor chamber;
- gas dissolving fluid level sensor means for sensing the level of gas dissolving fluid within said contactor chamber;
- gas dissolving fluid pump and driver control means for controlling the rate of transfer of gas dissolving fluid, from said source of gas dissolving fluid into said contactor chamber, responsive to said gas dissolving fluid level sensor, and operative to; keep the lower portion of said contactor chamber full of gas dissolving fluid and, keep the level of gas dissolving fluid below the upper portion of said contactor chamber;
- wherein said gas dissolving fluid level sensor means, and said gas dissolving fluid pump and driver control means, can be any one of the options: hand sensor and control means; automatic sensor and control means; and, a combination of hand and automatic sensor and control means;
- whereby gas dissolving fluid flows downward through said contactor chamber into said lower portion thereof and into said common rail distribution system and is injected therefrom into said cylinder gas volumes of said internal combustion engine;
- atomizing gas transfer means for transferring atomizing gas, from said source of atomizing gas, into said contactor chamber, and into the bottom of the lower portion of said contactor chamber and thus below the level of gas dissolving fluid within said contactor chamber;
- contactor chamber pressure sensor and control means for maintaining the gas pressure, in said upper portion of said contactor chamber, essentially constant about an average contactor chamber pressure, less than an upper set value of contactor chamber gas pressure, and greater than a lower set value of contactor chamber pressure, and comprising:

a sensor of contactor chamber pressure;

gas exit flow restrictor means for discharging a restricted exit flow of undissolved atomizing gas from the top of the upper portion of said contactor chamber and into the atmosphere as a receiver of discharged atomizing gas;

back pressure control means for adjusting the gas flow area of said gas flow restrictor means, responsive to said contactor chamber pressure sensor, and operative to; increase said gas flow area when sensed contactor chamber pressure exceeds said upper set value of contactor chamber pressure, and to decrease said gas flow area when sensed contactor chamber pressure is less than said lower set value of contactor chamber pressure;

wherein said average contactor chamber pressure is controlled to be sufficiently greater than the pressure prevailing in said cylinder gas volumes of said internal combustion engine, as to assure adequate gas dissolving fluid primary atomization into droplets when injected into said cylinder gas volumes;

wherein said contactor chamber pressure sensor and control means can be any one of the options: hand sensor and control means; automatic sensor and control means; and a combination of hand and automatic sensor and control means;

and further wherein the pressure prevailing, within said common rail distribution system, is essentially the same as said contactor chamber pressure, and is essentially fully applied along essentially the full length of the gas dissolving fluid flow path within said common rail distribution system, up to said cylinder gas volume;

whereby atomizing gas flows, from said source of atomizing gas, into said contactor chamber, below the level of gas dissolving fluid therein, and rises, as bubbles, countercurrent to the downward flow of gas dissolving fluid therethrough, and portions of said atomizing gas are dissolved into said gas dissolving fluid, which becomes partially saturated with soluble portions of said atomizing gas;

and further whereby said flow of gas dissolving fluid, with dissolved portions of atomizing gas, flows into said common rail distribution system, and is injected into the cylinder gas volumes of said piston internal combustion engine, where, at the lower pressures prevailing in said cylinder gas volume, said dissolved atomizing gas expands out of solution from said gas dissolving fluid, and breaks up the gas dissolving fluid droplets, thus increasing the surface available for fuel burning, and hence the rate and completeness of fuel combustion within each cylinder gas volume of said piston internal combustion engine.

16. The combination of a piston internal combustion engine with a common rail supplementary atomizer as described in claim 15:

wherein said gas dissolving fluid level sensor means is adjustable to adjust the level of gas dissolving fluid within said contactor chamber.

* * * * *